US012587267B2

(12) United States Patent
Sakamoto et al.

(10) Patent No.: US 12,587,267 B2
(45) Date of Patent: Mar. 24, 2026

(54) WIRELESS COMMUNICATION SYSTEM, RELAY APPARATUS, WIRELESS COMMUNICATION METHOD AND PROGRAM

(71) Applicant: NTT, Inc., Tokyo (JP)

(72) Inventors: Kazumitsu Sakamoto, Musashino (JP); Yosuke Fujino, Musashino (JP); Daisuke Goto, Musashino (JP); Yasuyoshi Kojima, Musashino (JP); Kiyohiko Itokawa, Musashino (JP)

(73) Assignee: NTT, Inc., Tokyo (JP)

( * ) Notice: Subject to any disclaimer, the term of this patent is extended or adjusted under 35 U.S.C. 154(b) by 303 days.

(21) Appl. No.: 18/267,671

(22) PCT Filed: Dec. 24, 2020

(86) PCT No.: PCT/JP2020/048460
§ 371 (c)(1),
(2) Date: Jun. 15, 2023

(87) PCT Pub. No.: WO2022/137435
PCT Pub. Date: Jun. 30, 2022

(65) Prior Publication Data
US 2024/0106524 A1 Mar. 28, 2024

(51) Int. Cl.
*H04B 7/185* (2006.01)
*H04W 72/0453* (2023.01)

(52) U.S. Cl.
CPC .... *H04B 7/18513* (2013.01); *H04W 72/0453* (2013.01)

(58) Field of Classification Search
CPC .............. H04B 7/18513; H04B 7/185; H04W 72/0453; H04W 84/06
See application file for complete search history.

(56) References Cited

U.S. PATENT DOCUMENTS

2011/0090841 A1* 4/2011 Shyy ..................... H04W 88/04
                                                                   370/319
2011/0170574 A1* 7/2011 Ripple .................... H04B 1/69
                                                                   375/140

(Continued)

OTHER PUBLICATIONS

Kiyohiko Itokawa et al., A Novel proposal for LEO satellite MIMO systems for 920MHz band IoT platform, IEICE Society Conference 2020, B-3-12, Sep. 2020 (with Bibliographic items).

*Primary Examiner* — Brian D Nguyen

(57) ABSTRACT

A transmission data controller determines a frequency bandwidth according to a relay apparatus position, the frequency bandwidth being used for a first signal transmitted from a first communication apparatus, on the basis of information regarding the number of first communication apparatuses with which a relay apparatus communicates at the relay apparatus position. The transmission data controller transmits band information indicating a frequency band selected from radio frequency bands that can be used for the first signal on the basis of the determined frequency bandwidth to the first communication apparatus. The first communication apparatus transmits the first signal having a frequency included in the frequency band indicated by the band information. The relay apparatus acquires waveform data of the first signal transmitted by the first communication apparatus, and transmits the acquired waveform data to a second communication apparatus by a second signal. The second communication apparatus performs reception processing of the first signal indicated by the waveform data acquired by performing reception processing of the second signal.

20 Claims, 17 Drawing Sheets

(56)         References Cited

U.S. PATENT DOCUMENTS

| | | | |
|---|---|---|---|
| 2017/0265177 A1* | 9/2017 | Liu ........................ | H04L 1/1861 |
| 2018/0123897 A1* | 5/2018 | Lee .......................... | H04B 7/02 |
| 2019/0020402 A1* | 1/2019 | Gharavi .............. | H04B 7/1555 |
| 2019/0340934 A1* | 11/2019 | Villa ........................ | G08G 5/56 |
| 2020/0319324 A1* | 10/2020 | Au ........................ | H04W 48/16 |
| 2020/0403689 A1* | 12/2020 | Rofougaran ........ | H04W 52/245 |
| 2021/0013959 A1* | 1/2021 | Yuan ................. | H04B 7/15571 |
| 2023/0171826 A1* | 6/2023 | Selvanesan ........... | H04W 76/14 |
| | | | 370/310 |
| 2023/0336239 A1* | 10/2023 | Schmidt ............. | H04L 41/0823 |

* cited by examiner

310

320  DATA STORAGE 340    330

RECEIVER    TARNSMITTER 350    360

CHANNEL SETTER    TRANSMISSION TIMING CONTROLLER

TERMINAL STATION

301

410  · · · · ·  410

RECEIVER ━ 420

BASE STATION SIGNAL RECEPTION PROCESSOR ━ 430

DISTRIBUTOR ━ 441

· · · · ·

SIGNAL PROCESSOR ━ 442

TERMINAL SIGNAL DECODER ━ 443

TERMINAL SIGNAL RECEPTION PROCESSOR ━ 440

BASE STATION ━ 401

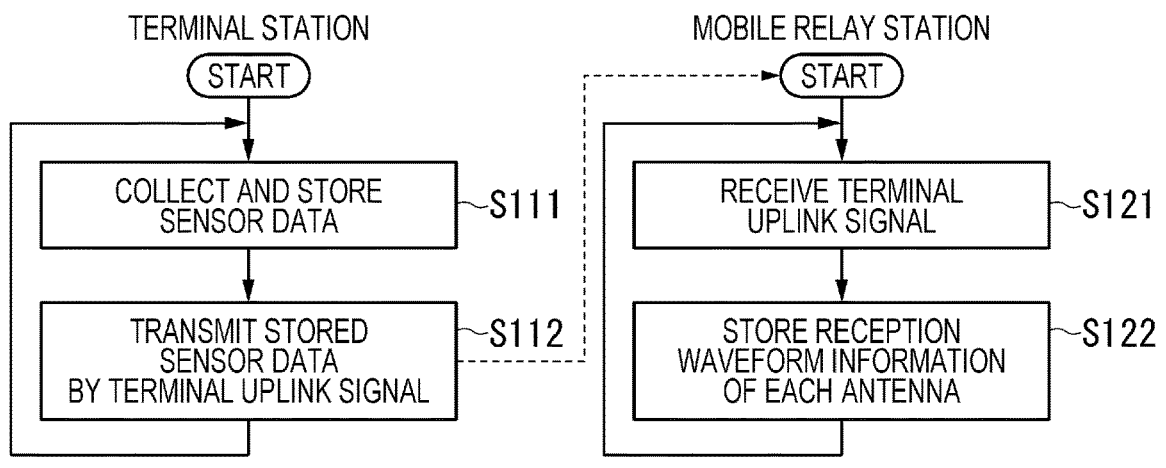

TERMINAL STATION

START

COLLECT AND STORE
SENSOR DATA — S111

TRANSMIT STORED
SENSOR DATA
BY TERMINAL UPLINK SIGNAL — S112

MOBILE RELAY STATION

START

RECEIVE TERMINAL
UPLINK SIGNAL — S121

STORE RECEPTION
WAVEFORM INFORMATION
OF EACH ANTENNA — S122

FIG. 5

MOBILE RELAY STATION

START $t \leftarrow ts$ — S211

ACQUIRE INFORMATION
OF POPULATION DENSITY
AT RECEPTION TIME t — S212

DETERMINE REQUIRED
FREQUENCY BAND ON BASIS
OF POPULATION DENSITY — S213

DETERMINE PERMITTED BAND
OR PERMITTED CHANNEL — S214

TRANSMIT PERMITTED
BAND INFORMATION
TO TERMINAL STATION — S215

GIVE INSTRUCTION FOR
SAMPLING OF PERMITTED BAND — S216

$t \leftarrow t+1$ — S217

TERMINAL STATION

START

RECEIVE TERMINAL
DOWNLINK SIGNAL — S221

SELECT USE CHANNEL — S222

SET CHANNEL — S223

FIG. 6

MOBILE RELAY STATION

TERMINAL STATION

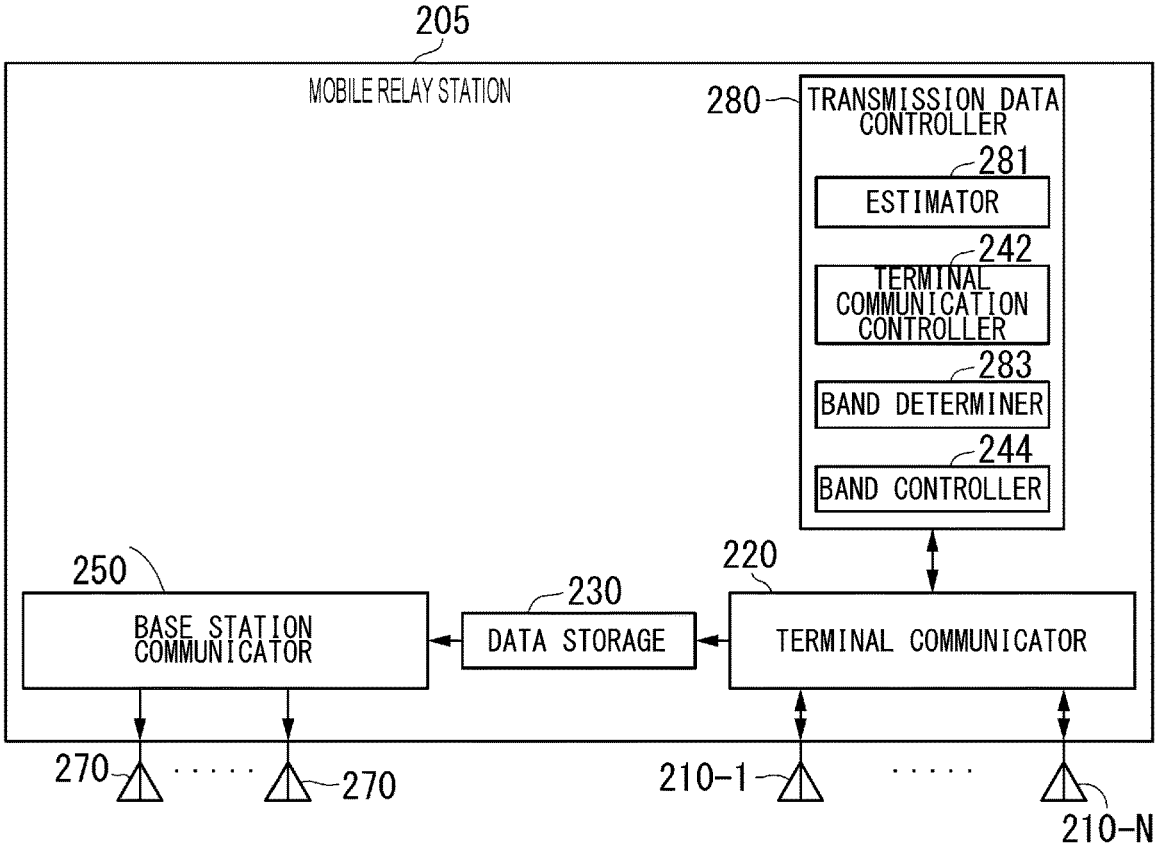

205

MOBILE RELAY STATION

280 — TRANSMISSION DATA CONTROLLER

281
ESTIMATOR

242
TERMINAL COMMUNICATION CONTROLLER

283
BAND DETERMINER

244
BAND CONTROLLER

250
BASE STATION COMMUNICATOR

230
DATA STORAGE

220
TERMINAL COMMUNICATOR

MOBILE RELAY STATION

293
BASE STATION COMMUNICATOR

294
STORAGE

295
CONTROLLER

253
TRANSMISSION DATA MODULATOR

254
TRANSMITTER

TRANSMITTING ANTENNA CONTROLLER

292

291
TRANSMISSION DATA CONTROLLER

230
DATA STORAGE

220
TERMINAL COMMUNICATOR

WIRELESS COMMUNICATION SYSTEM, RELAY APPARATUS, WIRELESS COMMUNICATION METHOD AND PROGRAM

CROSS-REFERENCE TO RELATED APPLICATIONS

This application is a 371 National Stage of International Application No. PCT/JP2020/048460, filed on Dec. 24, 2020. The entire disclosure of the above application is incorporated herein by reference.

TECHNICAL FIELD

The present invention relates to a wireless communication system, a relay apparatus, a wireless communication method and a program.

BACKGROUND ART

With the development of Internet of Things (IoT) technology, it has been studied to install IoT terminals including various sensors in various places. The IoT terminals may be installed in places where it is difficult to install a base station, such as a buoy or a ship on the sea, or a mountainous region, for example. Thus, it is considered that data collected by IoT terminals installed in various places is relayed to a base station installed on the ground by a relay apparatus mounted on a low earth orbiting satellite. For example, a relay apparatus mounted on a low earth orbiting satellite receives data from an IoT terminal and transmits received waveform data of an antenna to a base station (see, for example, Non Patent Literature 1). The base station restores a signal received by each antenna of a relay station by using the received waveform data received from the relay apparatus. The base station performs reception processing such as signal processing and decoding on the restored signal to obtain the data transmitted from the IoT terminal.

CITATION LIST

Non Patent Literature

Non Patent Literature 1: Kiyohiko Itokawa, Daisuke Goto, Yasuyoshi Kojima, Fumihiro Yamashita, Kento Yoshizawa, Kazumitsu Sakamoto, Yosuke Fujino, Chihaya Kato, and Mitsuhiro Nakadai, "Proposal of 920 MHz Band Satellite IoT Platform Utilizing Low Earth Orbit MIMO Technology", The Institute of Electronics, Information and Communication Engineers (IEICE), IEICE Society Conference 2020, B-3-12, September 2020

SUMMARY OF INVENTION

Technical Problem

In a case where a relay apparatus mounted on a low earth orbiting satellite transmits waveform data of an antenna that has received data from an IoT terminal to the ground, a communication band from the relay apparatus to a base station may be congested due to an enormous data amount.

In view of the above circumstances, an object of the present invention is to provide a wireless communication system capable of reducing the data amount when a relay apparatus relays received data while moving, a relay apparatus, a wireless communication method and a program.

Solution to Problem

An aspect of the present invention is a wireless communication system with a first communication apparatus, a second communication apparatus, and a relay apparatus moving, the wireless communication system including: a transmission data controller that determines a frequency bandwidth according to a relay apparatus position, the frequency bandwidth being used for a first signal transmitted from the first communication apparatus, on the basis of information regarding a number of the first communication apparatuses with which the relay apparatus communicates at the relay apparatus position, and transmits band information indicating a frequency band selected on the basis of the frequency bandwidth from a radio frequency band that can be used for the first signal to the first communication apparatus, in which the first communication apparatus includes: a first signal transmitter that transmits a first signal having a frequency included in the frequency band indicated by the band information, the relay apparatus includes: a first signal receiver that receives the first signal transmitted by the first communication apparatus and acquires waveform data of the first signal received; and a second signal transmitter that transmits the waveform data acquired by the first signal receiver to the second communication apparatus by a second signal, and the second communication apparatus includes: a second signal receiver that receives the second signal transmitted from the relay apparatus; a second signal reception processor that performs reception processing of the second signal received by the second signal receiver and acquires the waveform data; and a first signal reception processor that performs reception processing of the first signal indicated by the waveform data acquired by the second signal reception processor and acquires data set to the first signal by the first communication apparatus.

An aspect of the present invention is a relay apparatus in a wireless communication system with a first communication apparatus, a second communication apparatus, and the relay apparatus moving, the relay apparatus including: a transmission data control that determines a frequency bandwidth according to a relay apparatus position, the frequency bandwidth being used for a first signal transmitted from the first communication apparatus, on the basis of information regarding a number of the first communication apparatuses with which the relay apparatus communicates at the relay apparatus position, and transmits band information indicating a frequency band selected on the basis of the frequency bandwidth from a radio frequency band that can be used for the first signal to the first communication apparatus; a first signal receiver that receives a first signal transmitted by the first communication apparatus at a frequency included in a radio frequency band indicated by the band information and acquires waveform data of the first signal received; and a second signal transmitter that transmits the waveform data acquired by the first signal receiver to the second communication apparatus by a second signal.

An aspect of the present invention is a wireless communication method executed by a wireless communication system with a first communication apparatus, a second communication apparatus, and a relay apparatus moving, the wireless communication method including: a transmission data control step of, by a transmission data controller, determining a frequency bandwidth according to a relay apparatus position, the frequency bandwidth being used for a first signal transmitted from the first communication apparatus, on the basis of information regarding a number of the first communication apparatuses with which the relay apparatus communicates at the relay apparatus position, and transmitting band information indicating a frequency band selected on the basis of the frequency bandwidth from a radio frequency band that can be used for the first signal to the first communication apparatus; a first signal transmission step of, by the first communication apparatus, transmitting a first signal having a frequency included in the frequency band indicated by the band information; a first signal reception step of, by the relay apparatus, receiving the first signal transmitted by the first communication apparatus and acquiring waveform data of the first signal received; a second signal transmission step of, by the relay apparatus, transmitting the waveform data acquired by the first signal reception step to the second communication apparatus by a second signal; a second signal reception step of, by the second communication apparatus, receiving the second signal transmitted from the relay apparatus; a second signal reception processing step of, by the second communication apparatus, performing reception processing of the second signal received by the second signal reception step and acquiring the waveform data; and a first signal reception processing step of, by the second communication apparatus, performing reception processing of the first signal indicated by the waveform data acquired by the second signal reception processing step and acquiring data set to the first signal by the first communication apparatus.

An aspect of the present invention is a wireless communication method executed by a relay apparatus in a wireless communication system with a first communication apparatus, a second communication apparatus, and the relay apparatus moving, the wireless communication method including: a transmission data control step of determining a frequency bandwidth according to a relay apparatus position, the frequency bandwidth being used for a first signal transmitted from the first communication apparatus, on the basis of information regarding a number of the first communication apparatuses with which the relay apparatus communicates at the relay apparatus position, and transmitting band information indicating a frequency band selected on the basis of the frequency bandwidth from a radio frequency band that can be used for the first signal to the first communication apparatus; a first signal reception step of receiving a first signal transmitted by the first communication apparatus at a frequency included in a radio frequency band indicated by the band information and acquiring waveform data of the first signal received; and a second signal transmission step of transmitting the waveform data acquired by the first signal reception step to the second communication apparatus by a second signal.

An aspect of the present invention is a program of a relay apparatus in a wireless communication system with a first communication apparatus, a second communication apparatus, and the relay apparatus moving, the program causing a computer to execute: a transmission data control step of determining a frequency bandwidth according to a relay apparatus position, the frequency bandwidth being used for a first signal transmitted from the first communication apparatus, on the basis of information regarding a number of the first communication apparatuses with which the relay apparatus communicates at the relay apparatus position, and transmitting band information indicating a frequency band selected on the basis of the frequency bandwidth from a radio frequency band that can be used for the first signal to the first communication apparatus; and a control step of performing control such that waveform data of a first signal received from the first communication apparatus at a frequency included in a frequency band indicated by the band information is transmitted to the second communication apparatus by a second signal.

Advantageous Effects of Invention

According to the present invention, it is possible to reduce the data amount when the relay apparatus relays received data while moving.

BRIEF DESCRIPTION OF DRAWINGS

FIG. 5 is a flowchart illustrating processing of the wireless communication system according to the embodiment.

FIG. 6 is a flowchart illustrating processing of the wireless communication system according to the embodiment.

FIG. 18 is a configuration diagram of a mobile relay station according to a fifth embodiment.

FIG. 19 is a configuration diagram of a mobile relay station according to a sixth embodiment.

DESCRIPTION OF EMBODIMENTS

Figure 1:
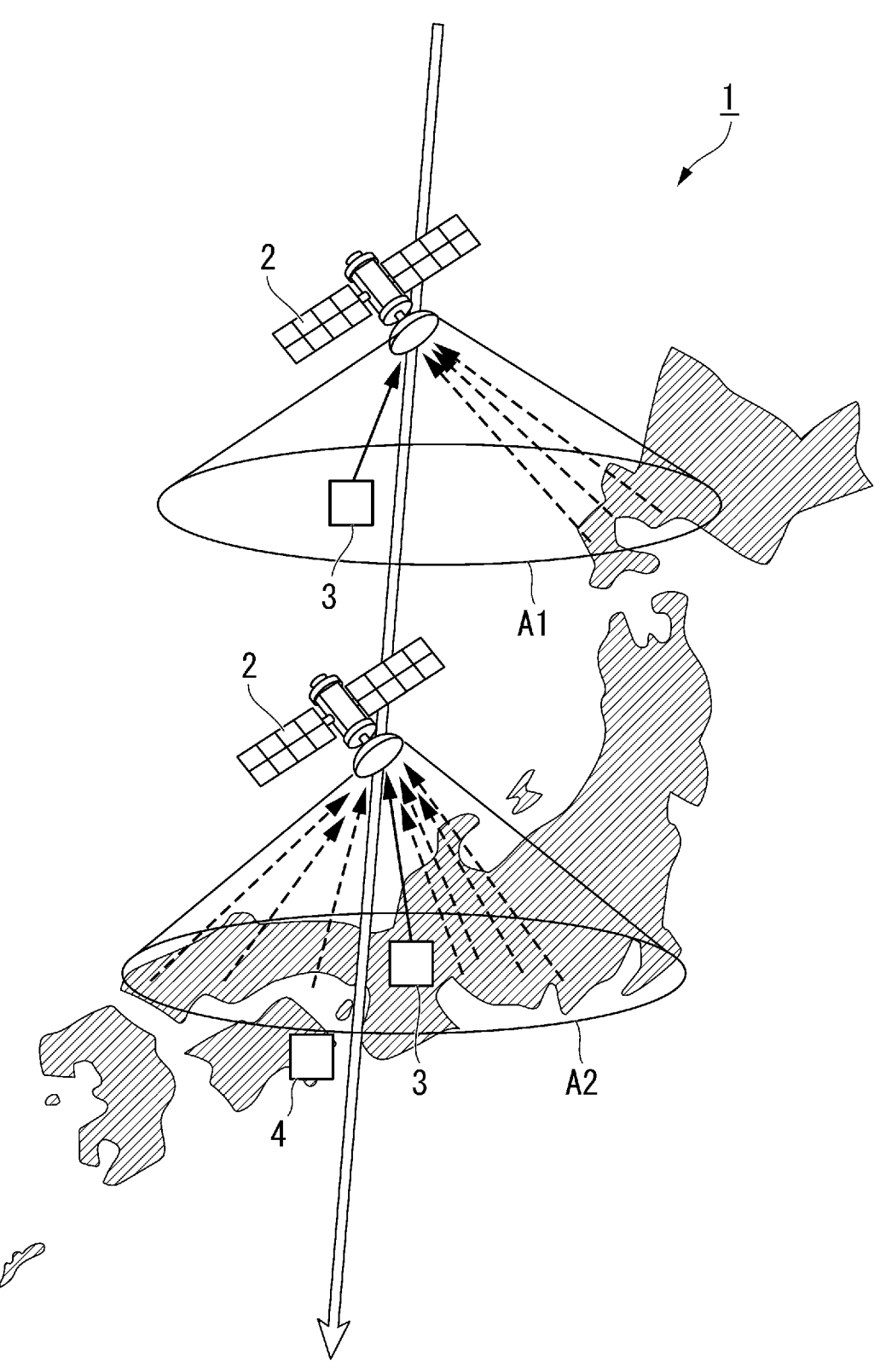
FIG. 1 is a diagram for describing a wireless communication system according to an embodiment of the present invention.

Embodiments of the present invention will be described in detail below with reference to the drawings. In each embodiment described below, the same components as those in other embodiments are denoted by the same reference numerals, and redundant description may be omitted.

FIG. 1 is a diagram for describing an outline of a wireless communication system 1 according to an embodiment of the present invention. The wireless communication system 1 includes a mobile relay station 2, a terminal station 3, and a base station 4. Although the number of each of the mobile relay stations 2, the terminal stations 3, and the base stations 4 included in the wireless communication system 1 is arbitrary, it is assumed that the number of terminal stations 3 is large.

The mobile relay station 2 is an example of a relay apparatus that is mounted on a mobile object and whose communicable area moves with the lapse of time. The mobile relay station 2 of the present embodiment is provided in a low earth orbit (LEO) satellite. The altitude of the LEO satellite is 2000 km or less, and the LEO satellite goes around the earth in about 1.5 hours per orbit. The terminal station 3 and the base station 4 are installed on the earth such as on the ground or on the sea. The terminal station 3 is, for example, an IoT terminal. A radio signal from the mobile relay station 2 to the terminal station 3 is referred to as a terminal downlink signal, a radio signal from the terminal station 3 to the mobile relay station 2 is referred to as a terminal uplink signal, a radio signal from the mobile relay station 2 to the base station 4 is referred to as a base station downlink signal, and a radio signal from the base station 4 to the mobile relay station 2 is referred to as a base station uplink signal.

The terminal station 3 collects data such as environment data detected by a sensor, and transmits a terminal uplink signal in which the collected data is set to the mobile relay station 2. The mobile relay station 2 receives the terminal uplink signal transmitted from each of the plurality of terminal stations 3 while moving above the earth. In FIG. 1, the mobile relay station 2 receives the terminal uplink signal from a terminal station 3 installed in Area A1, which is a communication destination, at a certain time. Thereafter, the mobile relay station 2 receives the terminal uplink signal from a terminal station 3 installed in Area A2, which is a communication destination. The mobile relay station 2 accumulates the data received from the terminal stations 3 by the terminal uplink signals, and wirelessly transmits the accumulated data to the base station 4 by the base station downlink signal at a timing at which communication with the base station 4 is possible. The base station 4 acquires the data collected by the terminal station 3 from the received base station downlink signal.

The mobile relay station 2 includes an antenna used for wireless communication with the terminal stations 3 and an antenna used for wireless communication with the base station 4. Therefore, the mobile relay station 2 can also perform wireless communication with the terminal stations 3 and wireless communication with the base station 4 simultaneously. Hereinafter, an antenna with which the mobile relay station 2 receives the terminal uplink signal transmitted from the terminal station 3 is also referred to as a receiving antenna, and an antenna with which the mobile relay station 2 transmits the base station downlink signal to the base station 4 is also referred to as a transmitting antenna.

As the mobile relay station, it is conceivable to use a relay station mounted on a geostationary satellite or an unmanned aerial vehicle such as a drone and a high altitude platform station (HAPS). However, in the case of a relay station mounted on a geostationary satellite, although the coverage area (footprint) on the ground is large, the link budget for an IoT terminal installed on the ground is very small due to the high altitude. On the other hand, in the case of a relay station mounted on a drone or a HAPS, although the link budget is high, the coverage area is narrow. Further, the drone requires a battery and the HAPS requires a solar panel. In the present embodiment, the mobile relay station 2 is mounted on an LEO satellite. Thus, in addition to the link budget remaining within limits, the LEO satellites have no air resistance to orbit outside the atmosphere and low fuel consumption. Furthermore, the footprint is also larger than that in a case where a relay station is mounted on a drone or a HAPS.

Since the mobile relay station 2 mounted on the LEO satellite performs communication while moving at a high speed, a time during which each terminal station 3 or the base station 4 can communicate with the mobile relay station 2 is limited. Specifically, when viewed on the ground, the mobile relay station 2 passes through the sky in about several minutes. Furthermore, wireless communication methods of various specifications are used for the terminal stations 3. Thus, the mobile relay station 2 receives terminal uplink signals from the terminal stations 3 within the coverage at the current position during movement, and stores waveform data obtained by sampling the waveforms of the received terminal uplink signals. The mobile relay station 2 wirelessly transmits the base station downlink signal to which the stored waveform data is set to the base station 4 at the timing when the base station 4 exists in the coverage. The base station 4 demodulates the base station downlink signal received from the mobile relay station 2 to obtain the waveform data. The base station 4 performs signal processing and decoding on the terminal uplink signal indicated by the waveform data to obtain terminal transmission data, which is data transmitted by the terminal station 3.

Furthermore, the mobile relay station 2 mounted on the LEO satellite has a smaller link budget than a case where a relay station is mounted on a drone or a HAPS. Thus, the mobile relay station 2 may receive the terminal uplink signal with a plurality of receiving antennas. For reception using a plurality of receiving antennas, for example, multiple input multiple output (MIMO) is used. Communication quality can be improved by a diversity effect and a beamforming effect of communication using a plurality of receiving antennas. Hereinafter, waveform data obtained by sampling the waveform of a terminal uplink signal received by a certain receiving antenna of the mobile relay station 2 is also referred to as the waveform data of the receiving antenna.

A large number of terminal stations 3 exists on the ground. Thus, the mobile relay station 2 receives the terminal uplink signal through a plurality of channels. However, as the number of channels increases, the frequency bandwidth sampled by the mobile relay station 2 increases. Therefore, the data amount of the waveform data becomes enormous, and there is a possibility that the downlink communication band between the mobile relay station 2 and the base station 4 is congested. Further, there is also a possibility that the power consumption of the mobile relay station 2 increases. Thus, in the present embodiment, when it is assumed that the number of terminal stations 3 in the communication area is small, the wireless communication system 1 reduces the number of channels used for the terminal uplink signal. Hence, the frequency bandwidth sampled by the mobile relay station 2 is narrowed, and the data amount of the waveform data is reduced.

As illustrated in FIG. 1, in Area A1 having a low population density, the number of terminal stations 3 is small, and the number of interference waves indicated by the broken line arrows is also small. Thus, when Area A1 is the communication destination, the wireless communication system 1 makes the frequency bandwidth of the terminal uplink signal narrower than the entire frequency bandwidth that can be used for the terminal uplink signal. Even when the number of terminal stations 3 transmitting at the same time and the same frequency increases, signals can be separated and decoded by reception beam control in the mobile relay station 2. On the other hand, in Area A2 having a high population density, the number of terminal stations 3 is large, and the number of interference waves indicated by the broken line arrows is also large. Thus, when Area A2 is the communication destination, the wireless communication system 1 makes the frequency bandwidth used for the terminal uplink signal wider than when Area A1 is the communication destination.

Detailed embodiments of the wireless communication system will be described below.

First Embodiment

The wireless communication system of the first embodiment determines a frequency bandwidth according to a population density in an area on the earth, which is a communication destination of the mobile relay station. The arrangement distribution of ground IoT terminals tends to be the same as the population distribution. That is, the more densely populated an area is, the more closely spaced the ground IoT terminals tend to be. Thus, the wireless communication system of the first embodiment determines the frequency bandwidth to be used on the basis of the data of the population density of the area where the mobile relay station collects data at each time. A mobile base station transmits waveform data obtained by sampling the determined frequency bandwidth to the base station.

The fact that the arrangement distribution of the ground IoT terminals and the population distribution tend to be the same is described, for example, in the reference document described below. In the reference document, an assumption that terminals are used in proportion to population density is used in calculating the average number of simultaneous communication apparatuses for each area of LPWA.
(Reference Document) the Ministry of Internal Affairs and
  Communications, Information and Communications
  Council, ""Technical Requirements for Upgrading of
  Low-power Radio Systems in 920 MHz Band", pp. 40-44,
  January 2020 in "Technical Requirements Necessary for
  Upgrading of Low-power Radio Systems""

Furthermore, instead of the information of the population density, information of the density of communication apparatuses that directly or indirectly communicate with the relay apparatus can be used. For example, there is a case where all the arrangement places of the ground IoT terminals are managed. In this case, instead of the information of the population density, information of the installation density of the ground IoT terminals obtained from the information of the positions of the ground IoT terminals may be used. Here, a case where the population density is used will be described as an example.

Figure 2:
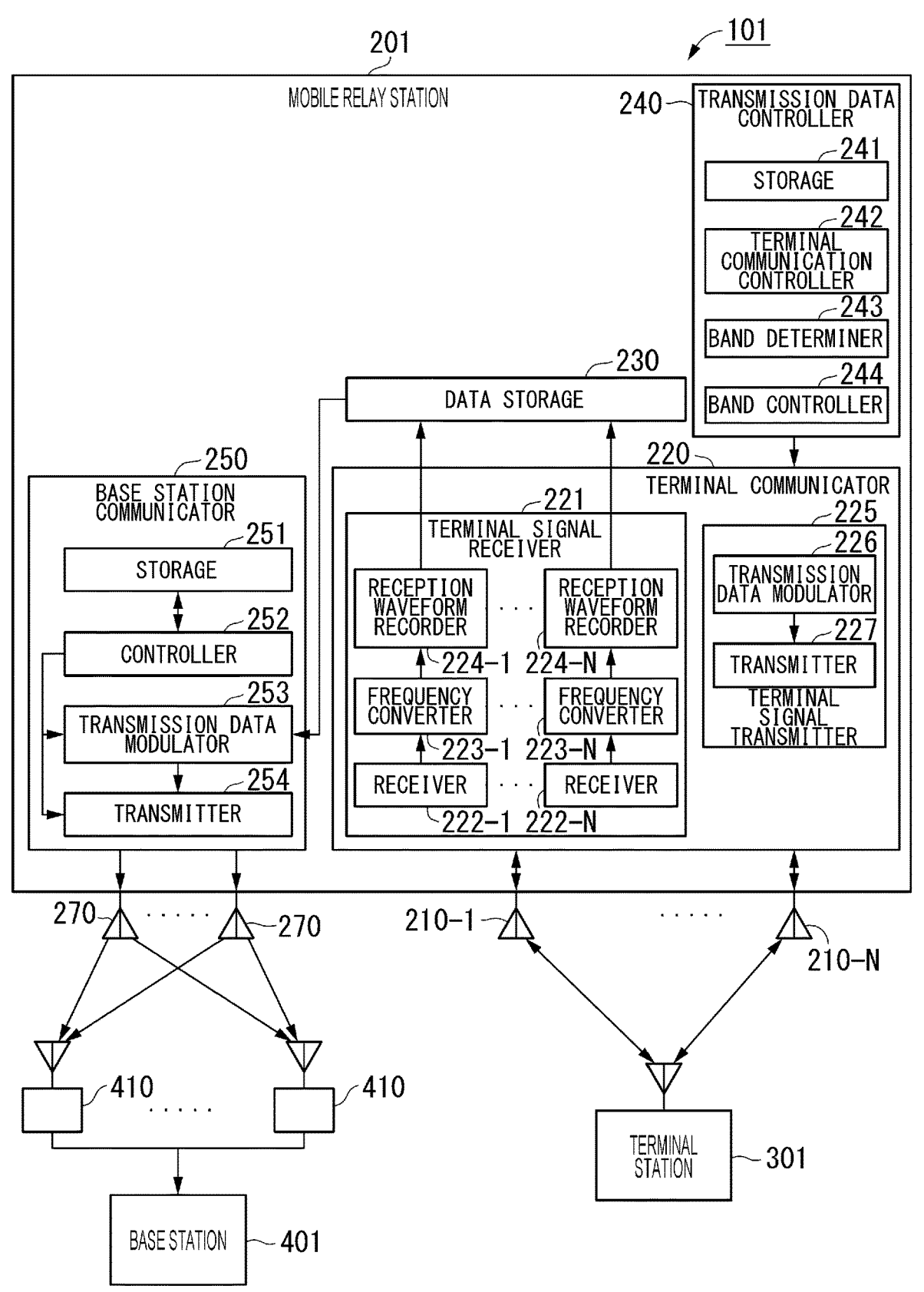
FIG. 2 is a configuration diagram of a wireless communication system according to a first embodiment.

FIG. 2 is a configuration diagram of a wireless communication system 101 according to the first embodiment. The wireless communication system 101 includes a mobile relay station 201, a terminal station 301, and a base station 401. The mobile relay station 201 is used as the mobile relay station 2 in FIG. 1, the terminal station 301 is used as the terminal station 3 in FIG. 1, and the base station 401 is used as the base station 4 in FIG. 1.

The mobile relay station 201 includes N (N is an integer of one or more) antennas 210, a terminal communicator 220, a data storage 230, a transmission data controller 240, a base station communicator 250, and M (M is an integer of two or more) antennas 270.

The antenna 210 transmits and receives a radio signal to and from the terminal station 301. The terminal communicator 220 includes a terminal signal receiver 221 and a terminal signal transmitter 225. The N antennas 210 are referred to as antennas 210-1 to 210-N.

The terminal signal receiver 221 includes N receivers 222, N frequency converters 223, and N reception waveform recorders 224. The N receivers 222 are referred to as receivers 222-1 to 222-N, the N frequency converters 223 are referred to as frequency converters 223-1 to 223-N, and the N reception waveform recorders 224 are referred to as reception waveform recorders 224-1 to 224-N.

The receiver 222-*n* (n is an integer of one or more and equal to or less than N) receives the terminal uplink signal with the antenna 210-*n*. The frequency converter 223-*n* frequency-converts the terminal uplink received by the receiver 222-*n* from a radio frequency (RF) signal into a baseband signal. For the frequency conversion, a quadrature demodulator or the like is used. The reception waveform recorder 224-*n* samples the reception waveform of the terminal uplink signal subjected to the frequency conversion by the frequency converter 223-*n*, and generates waveform data indicating a value obtained by the sampling. The reception waveform recorder 224 writes the reception waveform information in which the reception time of the terminal uplink signal and the waveform data of each antenna are set in the data storage 230.

The terminal signal transmitter 225 includes a transmission data modulator 226 and a transmitter 227. The transmission data modulator 226 converts transmission data to the terminal station 301 into a parallel signal and then modulates the parallel signal. The transmitter 227 weights the modulated parallel signal by a weight instructed from the transmission data controller 240 and generates a terminal downlink signal transmitted from each antenna 210. The transmitter 227 transmits the generated terminal downlink signal through the antenna 210.

The data storage 230 stores the reception waveform information generated by the reception waveform recorder 224.

The transmission data controller 240 includes a storage 241, a terminal communication controller 242, a band determiner 243, and a band controller 244. The storage 241 stores communication area information, population density information, and a weight for each transmission time. The communication area information is information indicating a communication area at each time. The communication area is an area on the earth, which is a communication destination of the mobile relay station 201. The mobile relay station 201 receives the terminal uplink signal from the terminal station 301 installed in the communication area. The communication area is calculated in advance on the basis of the orbit information of the LEO satellite. In other words, the communication area is determined by the position of the mobile relay station 201. The orbit information is information from which it is possible to obtain a position, a velocity, a moving direction, and the like at an arbitrary time of the LEO satellite on which the station is mounted. The population density information is information indicating the population density of each communication area. The weight for each transmission time is calculated in advance on the basis of the orbit information of the LEO satellite on which the station is mounted and the position of the base station 401.

The terminal communication controller 242 detects a communication start time with the communication area with reference to the communication area information.

Furthermore, the terminal communication controller 242 instructs the transmitter 227 regarding a transmission weight for each transmission time read from the storage 241.

The band determiner 243 refers to the communication area information and the population density information stored in the storage 241, and reads the value of the population density of the communication area at the reception time of the terminal uplink signal. The band determiner 243 calculates the required frequency bandwidth by substituting the acquired value of the population density as a parameter value into a relational expression for calculating the required frequency bandwidth using the population density as a parameter. The required frequency bandwidth is a frequency bandwidth assumed to be necessary for receiving the terminal uplink signals from all or a predetermined proportion or more of the terminal stations 301 in the communication area. This relational expression is predefined. Alternatively, relational data in which the range of the value of the population density is associated with the required frequency bandwidth may be stored in the storage 241. The band determiner 243 reads the required frequency bandwidth corresponding to the value of the population density from the relational data. The number of channels can also be used as the required frequency bandwidth. The band determiner 243 determines a frequency band or a channel permitted to be used by the terminal station 301 within the entire frequency band available for the terminal uplink signal on the basis of the required frequency bandwidth. The frequency band and the channel permitted to be used by the terminal station 301 are referred to as a permitted band and a permitted channel, respectively. The permitted band corresponds to a band including frequency bands of all permitted channels.

The band controller 244 notifies the terminal station 301 of permitted band information indicating the permitted band or the permitted channel determined by the band determiner 243 by a terminal downlink signal. Further, the band controller 244 instructs the reception waveform recorder 224 to sample the permitted band.

The base station communicator 250 transmits a base station downlink signal to the base station 401 by MIMO. The base station communicator 250 includes a storage 251, a controller 252, a transmission data modulator 253, and a transmitter 254. The storage 251 stores a transmission start timing calculated in advance on the basis of the orbit information of the LEO satellite on which the station is mounted and the position of the base station 401. Further, the storage 251 stores in advance a weight for each transmission time of the base station downlink signal transmitted from each antenna 270. The weight for each transmission time is calculated on the basis of the orbit information of the LEO satellite and the position of each antenna station 410 of the base station 401. Note that the base station communicator 250 may use a constant weight regardless of the transmission time.

The controller 252 controls the transmission data modulator 253 and the transmitter 254 to transmit the base station downlink signal to the base station 401 at the transmission start timing stored in the storage 251. Further, the controller 252 instructs the transmitter 254 regarding a weight for each transmission time read from the storage 251. The transmission data modulator 253 reads the reception waveform information from the data storage 230, and sets the read reception waveform information as transmission data. The transmission data modulator 253 converts the transmission data into a parallel signal and then modulates the parallel signal.

The transmitter 254 weights the modulated parallel signal by the weight instructed from the controller 252 and generates the base station downlink signal transmitted from each antenna 270. The transmitter 254 includes a power amplifier (not illustrated) such as a low noise amplifier (LNA) corresponding to each antenna 270. The transmitter 254 amplifies the base station downlink signal transmitted from a certain antenna 270 with the power amplifier corresponding to the antenna 270, and outputs the signal to the antenna 270. Hence, the base station downlink signal is transmitted from the M antennas 270 by MIMO. Note that the base station communicator 250 may use a weight only for reception of the base station downlink signal in the base station 401 without using a weight for transmission of the base station downlink signal.

The antenna 270 wirelessly transmits the base station downlink signal. Furthermore, the antenna 270 may receive the base station uplink signal wirelessly transmitted from the base station 401.

Figures 3, 4:
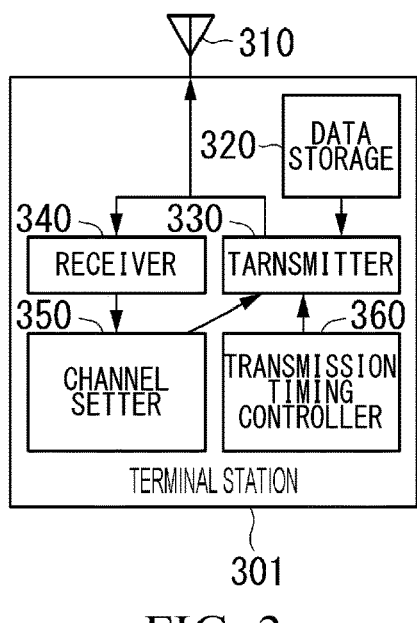
FIG. 3 is a configuration diagram of a terminal station according to the embodiment.
FIG. 4 is a configuration diagram of a base station according to the embodiment.

FIG. 3 is a block diagram illustrating a configuration of the terminal station 301. The terminal station 301 is an IoT terminal (ground IoT terminal) installed on the ground. The terminal station 301 transmits and receives signals by, for example, low power wide area (LPWA). LPWA includes LoRaWAN (registered trademark), Sigfox (registered trademark), long term evolution for machines (LTE-M), narrow band (NB)-IoT, and the like, but any wireless communication method can be used. Furthermore, the terminal station 301 may perform transmission with another terminal station 301 by time division multiplexing, orthogonal frequency division multiplexing (OFDM), or the like.

The terminal station 301 includes one or more antennas 310, a data storage 320, a transmitter 330, a receiver 340, a channel setter 350, and a transmission timing controller 360.

The data storage 320 stores sensor data or the like. The transmitter 330 reads sensor data from the data storage 320 as terminal transmission data. The transmitter 330 generates a terminal uplink signal in which the read terminal transmission data is set. The transmitter 330 transmits the terminal uplink signal at the transmission timing determined by the transmission timing controller 360 using a channel set by the channel setter 350.

The receiver 340 performs reception processing of the terminal downlink signal received by the antenna 310. The channel setter 350 randomly selects a channel to be used by the station from among channels included in the permitted band indicated by the permitted band information received by the terminal downlink signal or among the permitted channels indicated by the permitted band information. The channel setter 350 sets the selected channel in the transmitter 330. The transmission timing controller 360 determines the timing at which the station transmits the terminal uplink signal by a method determined in advance in a wireless communication method to be used.

FIG. 4 is a block diagram illustrating a configuration of the base station 401. The base station 401 includes a plurality of antenna stations 410, a receiver 420, a base station signal reception processor 430, and a terminal signal reception processor 440. The antenna station 410 is arranged at a position away from another antenna station 410 so that an arrival angle difference of signals from each of the plurality of antennas 270 of the mobile relay station 201 increases. Each antenna station 410 converts the base station downlink signal received from the mobile relay station 201 into an electrical signal and outputs the electrical signal to the receiver 420.

The receiver 420 aggregates the base station downlink signals received from the plurality of antenna stations 410. The receiver 420 stores a weight for each reception time with respect to the base station downlink signal received by each antenna station 410 on the basis of the orbit information of the LEO satellite and the position of each antenna station 410. The receiver 420 multiplies the base station downlink signal input from each antenna station 410 by a weight corresponding to the reception time of the base station downlink signal, and combines the reception signals multiplied by the weight. Note that the same weight may be used regardless of the reception time. The base station signal reception processor 430 demodulates and decodes the combined reception signal to obtain the reception waveform information. The base station signal reception processor 430 outputs the reception waveform information to the terminal signal reception processor 440.

The terminal signal reception processor 440 performs reception processing of the terminal uplink signal indicated by the reception waveform information. The terminal signal reception processor 440 acquires terminal transmission data by performing the reception processing according to the wireless communication method used for transmission by the terminal station 301. The terminal signal reception processor 440 includes a distributor 441, a signal processor 442, and a terminal signal decoder 443.

The distributor 441 reads the waveform data of each receiving antenna at the same reception time from the reception waveform information, and outputs the read waveform data to the signal processor 442. The signal processor 442 performs processing such as frame detection (terminal signal detection), Doppler shift compensation, and offline beam control. The frame detection is processing of detecting a section including a terminal transmission signal (terminal transmission frame) from waveform data. The signal processor 442 specifies the wireless communication method used by the terminal station 301 to transmit the terminal uplink signal on the basis of the information specific to the wireless communication method included in the reception signal indicated by the waveform data, and detects the terminal transmission frame according to the specified wireless communication method. The offline beam control is processing in which the mobile relay station 201 transmits recorded waveform data to the base station 401 without performing reception beam control, and the base station 401 performs reception beam control as post-processing. In the reception beam control, the signal processor 442 multiplies the reception signals of the respective reception systems by weights for performing amplitude correction and phase correction and then adds and combines the signals so that the signals are intensified and combined. Note that the signal processor 442 may simply add and combine the reception signals of the respective reception systems without performing the reception beam control. The signal processor 442 outputs a symbol obtained from the reception signal obtained by the addition and combination to the terminal signal decoder 443. The terminal signal decoder 443 decodes the symbol output from the signal processor 442 to obtain terminal transmission data transmitted from the terminal station 301. The terminal signal decoder 443 can also use a decoding method with a large calculation load, such as successive interference cancellation (SIC).

Note that, in the above description, the mobile relay station 201 and the base station 401 perform communication by MIMO, but it is not limited thereto. For example, the mobile relay station 201 may transmit the base station downlink signal to the base station 401 through one antenna 270. The base station 401 may receive the base station downlink signal with one antenna instead of the antenna station 410.

An operation of the wireless communication system 101 will be described.

FIG. 5 is a flowchart illustrating processing of the wireless communication system 101 in a case where a terminal uplink signal is transmitted from the terminal station 301. The terminal station 301 acquires data detected by a sensor, which is not illustrated, provided outside or inside at any time, and writes the acquired data in the data storage 320 (step S111). The transmitter 330 reads sensor data from the data storage 320 as terminal transmission data. The transmitter 330 generates a terminal uplink signal in which the terminal transmission data is set. The transmitter 330 wirelessly transmits the terminal uplink signal through the antenna 310 at the transmission start timing determined by the transmission timing controller 360 (step S112). The transmitter 330 uses the channel selected by the channel setter 350 according to FIG. 6 to be described below to transmit the terminal uplink signal. The terminal station 301 repeats the processing from step S111. Note that the terminal station 301 may perform transmission with another terminal station 301 by time division multiplexing, OFDM, MIMO, or the like.

The receiver 222 of the mobile relay station 201 receives the terminal uplink signal transmitted from the terminal station 301 through the antenna 210 (step S121). Depending on the wireless communication method of a transmission source terminal station 301, there are a case where the terminal uplink signal is received from only one terminal station 301 in a time division manner at the same frequency and a case where the terminal uplink signals are simultaneously received from a plurality of terminal stations 301 at the same frequency. The frequency converter 223-$n$ frequency-converts the terminal uplink signal received by the receiver 222-$n$ from an RF signal into a baseband signal. The reception waveform recorder 224-$n$ samples the waveform of the terminal uplink signal subjected to the frequency conversion by the frequency converter 223-$n$, and generates waveform data indicating a value obtained by the sampling. The frequency band to be sampled is instructed by the band controller 244 in FIG. 6 to be described below. The reception waveform recorder 224-$n$ writes the reception waveform information in which the reception time, and the waveform data of the antenna 210-$n$, and use band information are associated with each other in the data storage 230 (step S122). The use band information indicates a frequency band to be sampled, that is, a permitted band. The mobile relay station 201 repeats the processing from step S121.

FIG. 6 is a flowchart illustrating transmission data control processing by the wireless communication system 101. The band determiner 243 of the mobile relay station 201 sets an initial value is at reception time t (step S211). The reception time t represents the reception time of the terminal uplink signal in the mobile relay station 201. Here, the reception time t is represented by a count value of a unit time elapsed from the reference time. The initial value ts is the current time.

The band determiner 243 reads information of the communication area at the reception time t from the communication area information stored in the storage 241. The band determiner 243 acquires a value of the population density of the communication area from the population density information stored in the storage 241 (step S212). The band determiner 243 calculates the required frequency bandwidth by substituting the acquired value of the population density as a parameter value into a relational expression for calculating the required frequency bandwidth using the population density as a parameter (step S213).

The band determiner 243 determines a permitted band or a permitted channel on the basis of the required frequency bandwidth (step S214). It is assumed that channels included in the entire frequency band that can be used for the terminal uplink signal are K channels of channels Ch1 to ChK (K is an integer of one or more), and frequencies are higher in order of Ch1 to ChK.

Furthermore, it is assumed that the calculation result of the required frequency bandwidth is a frequency bandwidth corresponding to the number of channels k, or the number of channels k. In this case, the band determiner 243 selects a frequency band of a required frequency bandwidth or a frequency band including consecutive k channels among the channels Ch1 to ChK within the entire available frequency band as the permitted band. Alternatively, the band determiner 243 selects consecutive k channels from the channels Ch1 to ChK included in the entire available frequency band as the permitted channels.

Furthermore, the band determiner 243 may not select the permitted channels of consecutive frequencies. In this case, the required frequency bandwidth is represented by the number of channels. The band determiner 243 selects permitted channels of the number of channels k from among the K channels Ch1 to ChK included in the entire frequency band that can be used for the terminal uplink signal. The band determiner 243 selects a frequency band including all the k permitted channels to be narrower than a frequency band including the channels Ch1 to ChK. Note that, in a case where the required frequency bandwidth calculated in step S213 is the same as the required frequency bandwidth at time (t−1), the band determiner 243 may use the permitted band or the permitted channel at the time (t−1) as it is.

The band controller 244 outputs the permitted band information in which the permitted band or the permitted channel selected by the band determiner 243 in step S214 is set, to the terminal signal transmitter 225 as the transmission data. The transmission data modulator 226 converts the transmission data into a parallel signal corresponding to each antenna 210 and then modulates the parallel signal. The transmitter 227 weights the modulated parallel signal by a weight instructed from the terminal communication controller 242 and generates a terminal downlink signal transmitted from each antenna 210. The transmitter 227 transmits the generated terminal downlink signal through each antenna 210 (step S215).

The band controller 244 instructs the reception waveform recorder 224 to sample the permitted band (step S216). Hence, in step S122 of FIG. 5, the reception waveform recorder 224 samples the reception signal of the permitted band and generates the waveform data of the terminal uplink signal. The band determiner 243 adds 1 to the reception time t (step S217) and repeats the processing from step S212.

The receiver 340 of the terminal station 301 performs reception processing of the terminal downlink signal received by the antenna 310 (step S221). The receiver 340 outputs the permitted band information obtained by the reception processing to the channel setter 350. The channel setter 350 randomly selects a channel to be used from among channels included in the permitted band indicated by the permitted band information.

Alternatively, the channel setter 350 randomly selects a channel to be used from among permitted channels indicated by the permitted band information (step S222). The channel setter 350 sets the channel selected in step S222 in the transmitter 330 (step S223). Hence, in step S112 of FIG. 5, the transmitter 330 transmits the terminal uplink signal using the channel selected by the channel setter 350.

The transmission data controller 240 may perform the processing illustrated in FIG. 6 while a time earlier than the current time is used as the reception time t. Thus, the transmission data controller 240 can determine the permitted band or the permitted channel in advance before receiving the terminal uplink signal. In this case, in step S211, the band determiner 243 uses the time earlier than the current time as the initial value ts. Then, in step S214, the band determiner 243 further performs processing of storing band control information in which the reception time t and the permitted band information indicating the permitted band or the permitted channel at the reception time t are associated with each other in the storage 241. After step S214, the transmission data controller 240 proceeds to the processing of step S217 without performing the processing of steps S215 and S216. The band determiner 243 or the band controller 244 reads the permitted band information corresponding to the current time from the band control information stored in the storage 241. The band controller 244 performs the processing of steps S215 and S216 using the read permitted band information.

Figure 7:
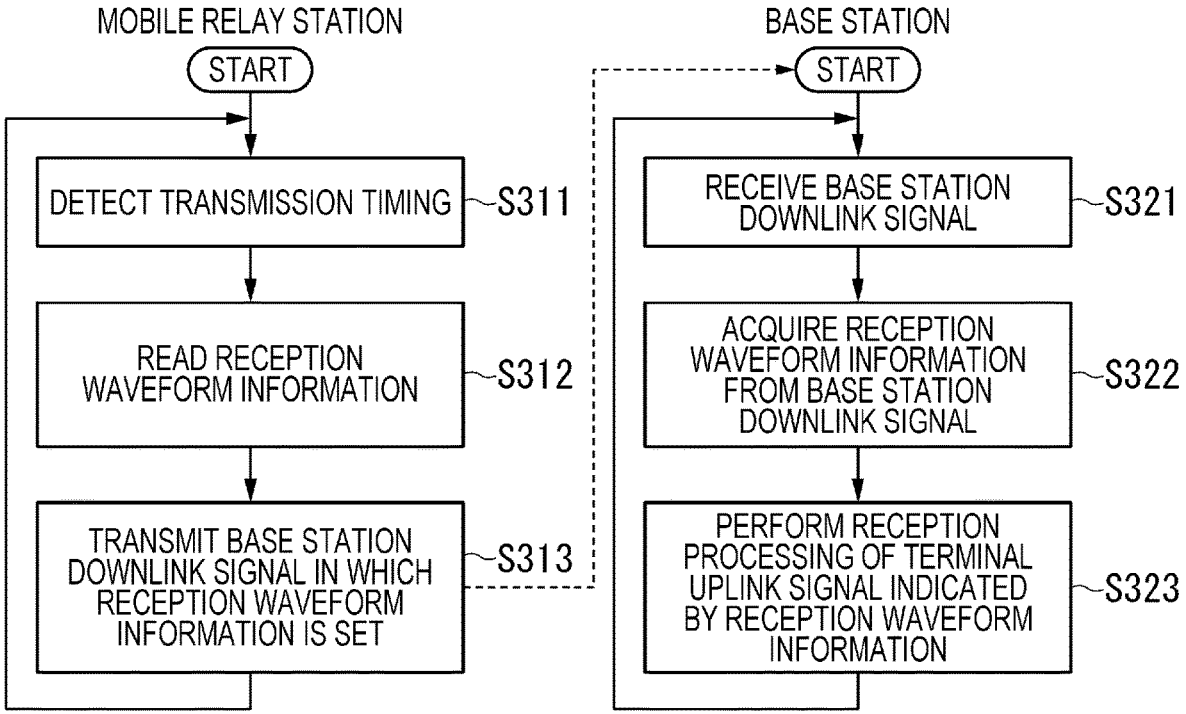
FIG. 7 is a flowchart illustrating processing of the wireless communication system according to the embodiment.

FIG. 7 is a flowchart illustrating processing of the wireless communication system 101 in a case where a base station downlink signal is transmitted from the mobile relay station 201. When detecting that it is the transmission start timing stored in the storage 251, the controller 252 included in the base station communicator 250 of the mobile relay station 201 instructs the transmission data modulator 253 and the transmitter 254 to transmit the reception waveform information (step S311).

The transmission data modulator 253 reads the reception waveform information accumulated in the data storage 230 as transmission data (step S312). Here, the reception waveform information read by the transmission data modulator 253 is reception waveform information in which the reception time after the reception time set in the reception waveform information transmitted to the base station 401 last is set. The transmission data modulator 253 parallel-converts the acquired transmission data and then modulates the data.

The transmitter 254 weights the transmission data modulated by the transmission data modulator 253 by the weight instructed from the controller 252 and generates the base station downlink signal, which is a transmission signal transmitted from each antenna 270. The transmitter 254 transmits each generated base station downlink signal through the antenna 270 by MIMO (step S313). The mobile relay station 201 repeats the processing from step S311.

Each antenna station 410 of the base station 401 receives the base station downlink signal from the mobile relay station 201 (step S321). Each antenna station 410 outputs the reception signal obtained by converting the received base station downlink signal into an electrical signal to the receiver 420. The receiver 420 synchronizes the timings of the reception signals received from the respective antenna stations 410. The receiver 420 multiplies the reception signal received by each antenna station 410 by the weight and adds the reception signals. The base station signal reception processor 430 demodulates the added reception signals and decodes the demodulated reception signals. Hence, the base station signal reception processor 430 obtains the reception waveform information (step S322). The base station signal reception processor 430 outputs the reception waveform information to the terminal signal reception processor 440.

The terminal signal reception processor 440 performs reception processing of the terminal uplink signal indicated by the reception waveform information (step S323). Specifically, the distributor 441 reads the waveform data having the same reception time from the reception waveform information. The distributor 441 outputs the read waveform data and antenna identification information associated with the waveform data to the signal processor 442. The signal processor 442 performs frame detection (terminal signal detection), Doppler shift compensation, and offline beam control on each of the reception signals indicated by the waveform data output from the distributor 441, and adds and combines the reception signals. By the addition and combination, the signal transmitted by the terminal station 301 is emphasized because of the correlation, but the influence of randomly added noise is reduced. Therefore, the diversity effect can be obtained for the terminal uplink signals that the mobile relay station 201 simultaneously receives from only one terminal station 301. Furthermore, the terminal uplink signals simultaneously received by the mobile relay station 201 from a plurality of terminal stations 301 correspond to performing MIMO communication. The signal processor 442 outputs a symbol of the added and combined reception signals to the terminal signal decoder 443. The terminal signal decoder 443 decodes the symbol input from the signal processor 442 to obtain terminal transmission data transmitted from the terminal station 301.

According to the first embodiment, the mobile relay station 201 reduces the frequency bandwidth used for the terminal uplink signal when communicating with a communication area where the number of terminal stations 301 is assumed to be small. Hence, a data amount of the waveform data of the terminal uplink signal is reduced, and a use band of the base station downlink signal for transmitting the waveform data is reduced.

Second Embodiment

In the first embodiment, the mobile relay station determines the permitted band or the permitted channel. In the second embodiment, the base station determines the permitted band or the permitted channel. In the second embodiment, differences from the first embodiment will be mainly described.

Figure 8:
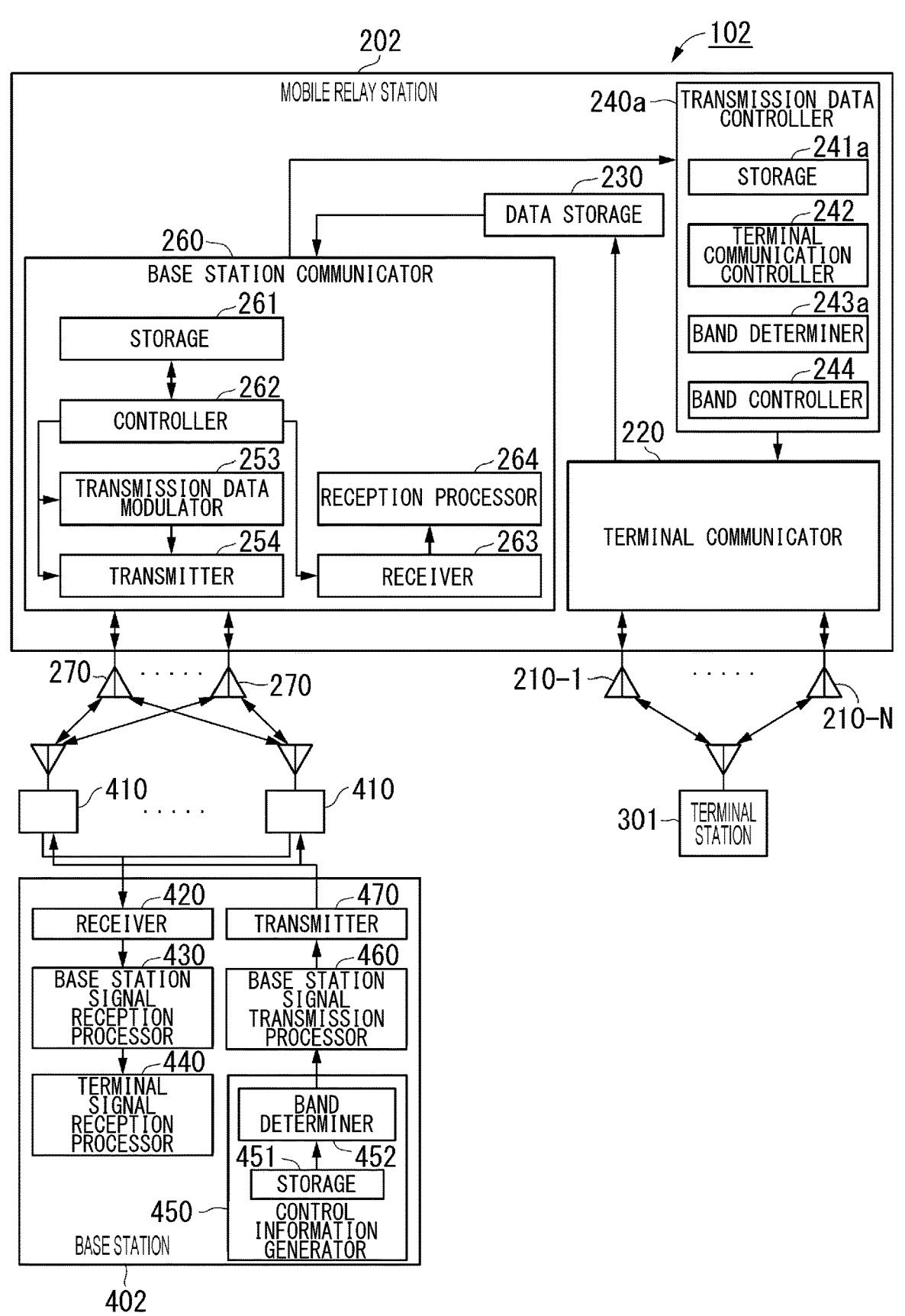
FIG. 8 is a configuration diagram of a wireless communication system according to a second embodiment.

FIG. 8 is a configuration diagram of a wireless communication system 102 according to the second embodiment. In FIG. 8, the same portions as those of the wireless communication system 101 of the first embodiment illustrated in FIG. 2 and the base station 401 of the first embodiment illustrated in FIG. 4 are denoted by the same reference numerals, and description thereof will be omitted. The wireless communication system 102 includes a mobile relay station 202, a terminal station 301, and a base station 402. The mobile relay station 202 is used as the mobile relay station 2 in FIG. 1, and the base station 402 is used as the base station 4 in FIG. 1.

The mobile relay station 202 illustrated in FIG. 8 is different from the mobile relay station 201 illustrated in FIG. 2 in that the mobile relay station 202 includes a transmission data controller 240a instead of the transmission data controller 240 and a base station communicator 260 instead of the base station communicator 250.

The transmission data controller 240a includes a storage 241a, a terminal communication controller 242, a band determiner 243a, and a band controller 244. The storage 241a stores communication area information, a weight for each transmission time, and band control information. The band control information indicates the permitted band information at each reception time. The permitted band information indicates a permitted band or a permitted channel. The band determiner 243a reads the permitted band information corresponding to the current time from the band control information stored in the storage 241a, and outputs the permitted band information to the band controller 244.

The base station communicator 260 transmits and receives a radio signal to and from the base station 402. The base station communicator 260 is different from the base station communicator 250 included in the mobile relay station 201 illustrated in FIG. 2 in that the base station communicator 260 includes a storage 261 instead of the storage 251 and a controller 262 instead of the controller 252, and further includes a receiver 263 and a reception processor 264. In addition to the same information as that of the storage 251 of the first embodiment illustrated in FIG. 2, the storage 261 stores a reception weight to be applied to the base station uplink signal received by each antenna 270 from a communication destination base station 402 for each reception time. The reception weight for each reception time is calculated on the basis of the orbit information of the LEO satellite and the position of each antenna station 410 of the communication destination base station 402.

The controller 262 performs the same processing as the controller 252 illustrated in FIG. 2. Further, the controller 262 reads the reception weight of each antenna 270 for each reception time from the storage 261, and instructs the receiver 263 regarding the read reception weight. The receiver 263 receives the base station uplink signal by each antenna 270, multiplies the reception signal received by each antenna 270 by the reception weight instructed by the controller 262, and then adds and combines the reception signals. The reception processor 264 demodulates and decodes the reception signals added and combined by the receiver 263 and obtains transmission data transmitted by the base station 402.

The base station 402 illustrated in FIG. 8 is different from the base station 401 illustrated in FIG. 4 in that the base station 402 further includes a control information generator 450, a base station signal transmission processor 460, and a transmitter 470. Note that an external apparatus connected to the base station 402 may include the control information generator 450.

The control information generator 450 generates band control information of each mobile relay station 202. The control information generator 450 includes a storage 451 and a band determiner 452.

The storage 451 stores the communication area information of the LEO satellite on which each mobile relay station 202 is mounted, and population density information. The band determiner 452 performs the same processing as the band determiner 243 of the mobile relay station 201 illustrated in FIG. 2 for each mobile relay station 202. Hence, the band determiner 452 calculates the required frequency bandwidth at each reception time for each mobile relay station 202, and determines the permitted band or the permitted channel on the basis of the required frequency bandwidth. The band determiner 452 generates band control information indicating the permitted band information at each time for each mobile relay station 202. The permitted band information indicates a permitted band or a permitted channel determined by the band determiner 452. The band determiner 452 outputs the generated band control information as transmission data to the base station signal transmission processor 460.

The base station signal transmission processor 460 converts the transmission data into a parallel signal transmitted from each antenna station 410 and then modulates the parallel signal. The transmitter 470 weights the parallel signal transmitted from each antenna station 410 by a transmission weight and generates the base station uplink signal transmitted from each antenna station 410. The transmitter 470 outputs the generated base station uplink signal to the corresponding antenna station 410. The antenna station 410 wirelessly transmits the base station uplink signal.

The wireless communication system 102 operates in the same manner as illustrated in FIG. 5 for transmission and reception of the terminal uplink signal in which the terminal transmission data is set, and operates in the same manner as illustrated in FIG. 7 for transmission and reception of the base station downlink signal in which the reception waveform information is set. Furthermore, the wireless communication system 102 performs the processing of FIG. 9 for each mobile relay station 202 to generate information used for transmission data control by each mobile relay station 202.

Figure 9:
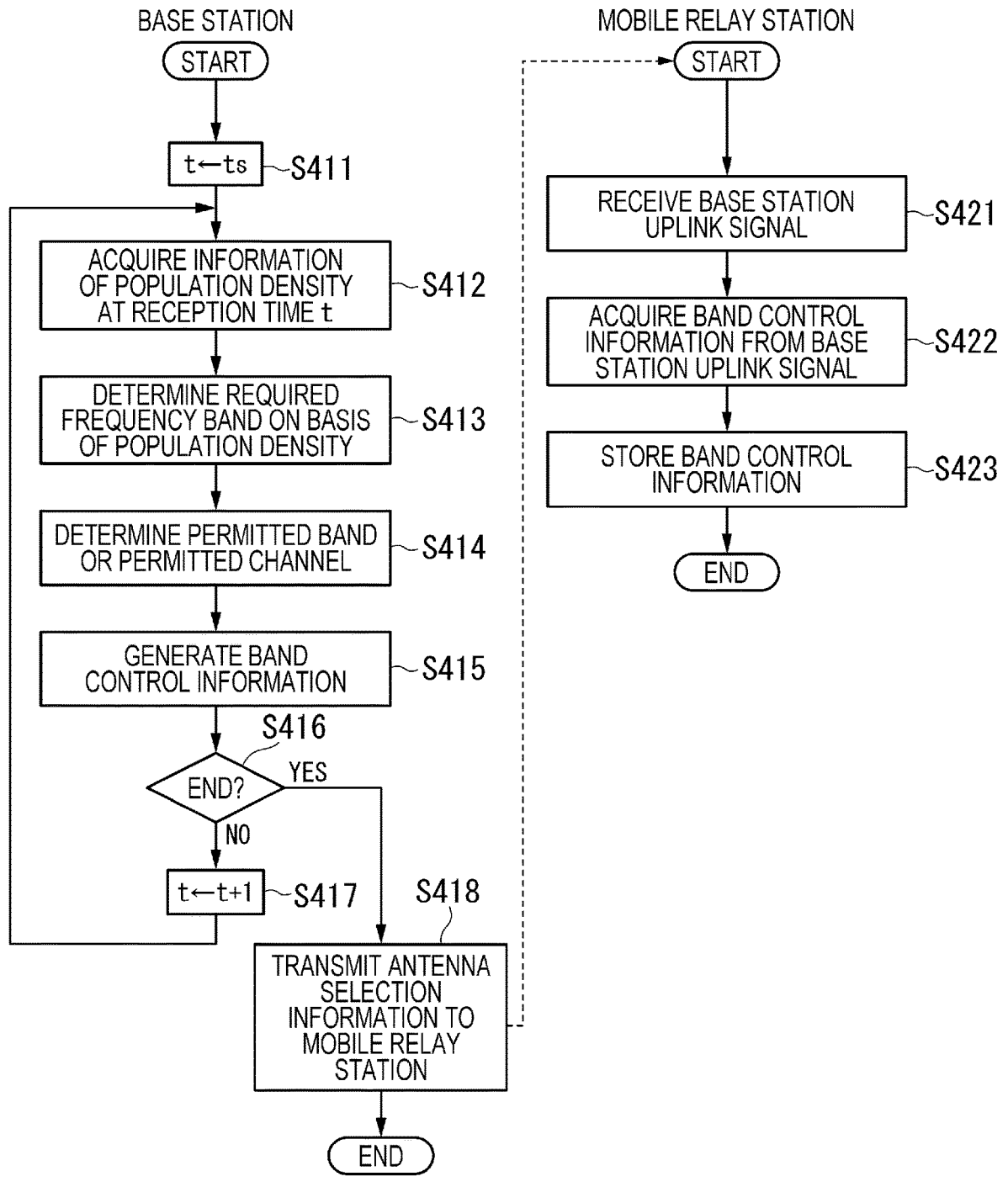
FIG. 9 is a flowchart illustrating processing of the wireless communication system according to the embodiment.

FIG. 9 is a flowchart illustrating information generation processing by the wireless communication system 102. The band determiner 452 of the base station 402 sets an initial value ts at reception time t (step S411). The initial value ts is a time earlier than the current time.

The band determiner 452 refers to the communication area information and the population density information stored in the storage 451, and performs the same processing as in step S212 in FIG. 6. Hence, the band determiner 452 acquires the value of the population density in the communication area of the mobile relay station 202 at time t (step S412). The band determiner 452 calculates a required frequency bandwidth based on the value of the population density acquired in step S412 by the same processing as in step S213 in FIG. 6 (step S413). The band determiner 452 determines a permitted band or a permitted channel on the basis of the required frequency bandwidth by the same processing as step S214 in FIG. 6 (step S414). The band determiner 452 generates band control information in which the reception time t is associated with the permitted band information indicating the permitted band or the permitted channel determined in step S414 (step S415).

The band determiner 452 determines whether a predetermined end condition is satisfied (step S416). The end condition can be, for example, a case where the reception time t reaches a predetermined time, a case where the loop processing from steps S412 to S417 is performed a predetermined number of times, or the like.

When determining that the end condition is not satisfied (step S416: NO), the band determiner 452 adds 1 to the reception time t (step S417) and repeats the processing from step S412. When determining that the end condition is satisfied (step S416: YES), the band determiner 452 outputs the generated band control information to the base station signal transmission processor 460.

The base station signal transmission processor 460 sets the band control information input from the band determiner 452 as transmission data. The base station signal transmission processor 460 converts the transmission data into a parallel signal and then modulates the parallel signal. The transmitter 470 weights the modulated parallel signal by a transmission weight and generates the base station uplink signal. The transmitter 470 outputs the generated base station uplink signal to the corresponding antenna station 410. The antenna station 410 wirelessly transmits the base station uplink signal (step S418).

Each antenna 270 of the mobile relay station 202 receives the base station uplink signal (step S421). The controller 262 reads the reception weight of each antenna 270 for each reception time from the storage 261, and instructs the receiver 263 regarding the read reception weight. The receiver 263 multiplies the base station uplink signal received by each antenna 270 by the reception weight instructed by the controller 262, and then adds and combines the signals. The reception processor 264 demodulates and decodes the reception signals added and combined by the receiver 263 and obtains band control information transmitted by the base station 402 (step S422). The reception processor 264 outputs the band control information to the band determiner 243a. The band determiner 243a stores the band control information in the storage 241a (step S423).

The wireless communication system 102 performs the transmission data control processing of FIG. 6 except for the points described below. That is, instead of the processing of steps S212 to S214, the band determiner 243a of the mobile relay station 202 performs processing of reading the permitted band information corresponding to the reception time t representing the current time from the band control information stored in the storage 241a.

Note that the band determiner 452 may transmit bandwidth control information indicating a required frequency bandwidth at each time to the mobile relay station 202 instead of the band control information. In this case, the band determiner 452 does not perform the processing of step S414 of FIG. 9, but generates the bandwidth control information in which the time t and the required frequency bandwidth at the time t are associated with each other in step S415. Then, in step S418, the band determiner 452 outputs the generated bandwidth control information to the base station signal transmission processor 460. Hence, the base station 402 wirelessly transmits the base station uplink signal in which the bandwidth control information is set.

Then, in step S422, the base station communicator 260 of the mobile relay station 202 acquires the bandwidth control information from the base station uplink signal, and outputs the bandwidth control information to the transmission data controller 240a. In step S423, a band controller 244a stores the bandwidth control information in the storage 241a. Then, the transmission data controller 240a performs the transmission data control processing of FIG. 6 except for the points described below. That is, the transmission data controller 240a performs processing of reading the information of the required frequency bandwidth corresponding to the reception time t representing the current time from the bandwidth control information stored in the storage 241a instead of the processing of steps S212 and S213.

According to the second embodiment, similarly to the first embodiment, it is possible to reduce the data amount of the waveform data of the terminal uplink signal in the case of communication with a communication area in which the number of terminal stations is assumed to be small. Furthermore, it is possible to reduce the load on the mobile relay station regarding the selection of the permitted band or the permitted channel as compared with the first embodiment.

Third Embodiment

In the third embodiment, the base station notifies the terminal station of the permitted band or the permitted channel determined by the base station of the second embodiment. In the third embodiment, differences from the first and second embodiments will be mainly described.

Figure 10:
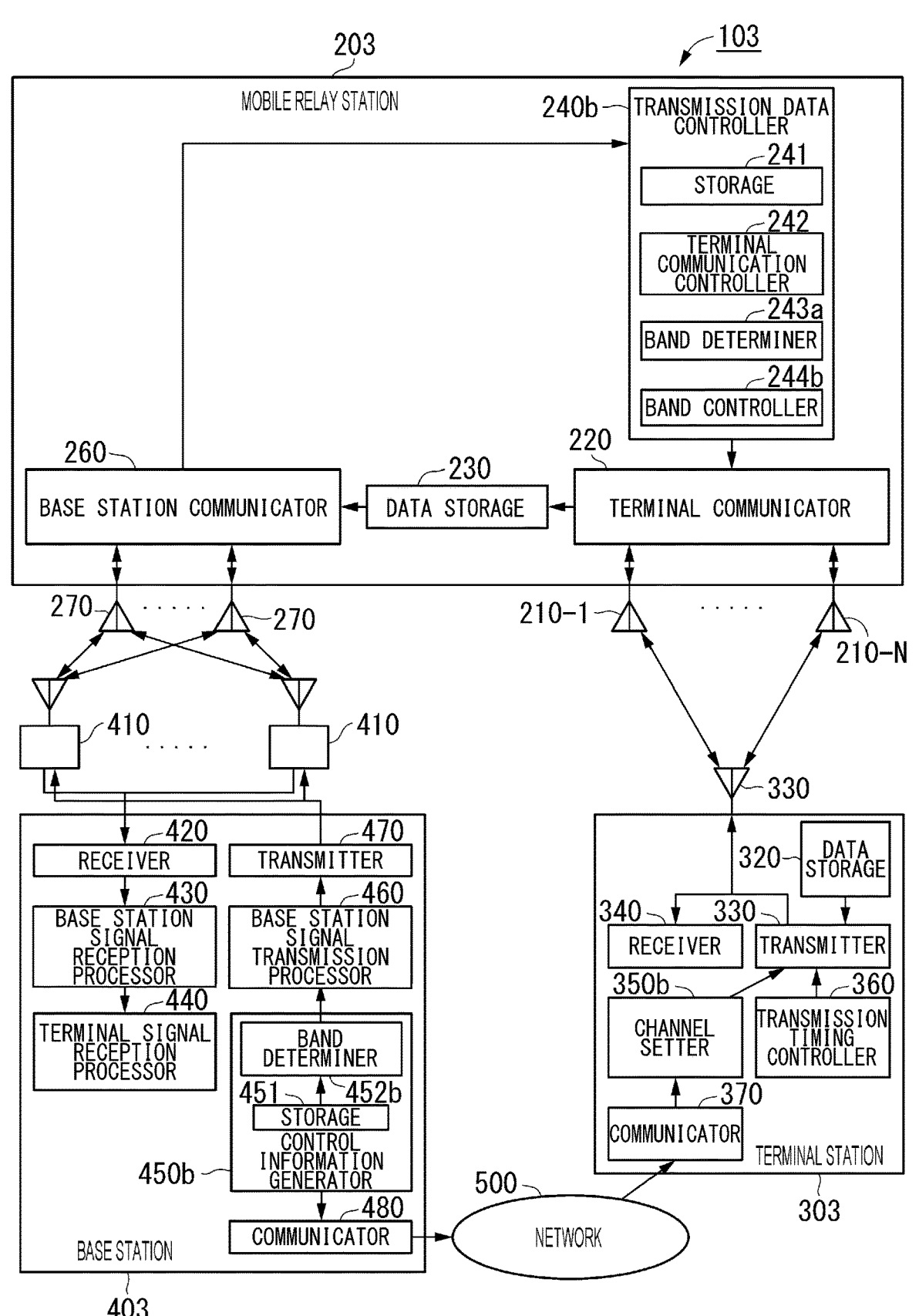
FIG. 10 is a configuration diagram of a wireless communication system according to a third embodiment.

FIG. 10 is a configuration diagram of a wireless communication system 103 according to the third embodiment. In FIG. 10, the same portions as those of the wireless communication system 102 of the second embodiment illustrated in FIG. 8 and the terminal station 301 of the first embodiment illustrated in FIG. 3 are denoted by the same reference numerals, and description thereof will be omitted. The wireless communication system 103 includes a mobile relay station 203, a terminal station 303, and a base station 403. The mobile relay station 203 is used as the mobile relay station 2 in FIG. 1, the terminal station 303 is used as the terminal station 3 in FIG. 1, and the base station 403 is used as the base station 4 in FIG. 1.

The mobile relay station 203 is different from the mobile relay station 202 illustrated in FIG. 8 in that the mobile relay station 203 includes a transmission data controller 240*b* instead of the transmission data controller 240*a*. The transmission data controller 240*b* is different from the transmission data controller 240*a* illustrated in FIG. 8 in that the transmission data controller 240*b* includes a band controller 244*b* instead of the band controller 244*a*. The band controller 244*b* has the same function as the band controller 244*a* except that the band controller 244*b* does not notify the terminal station 303 of the permitted band information.

The terminal station 303 is different from the terminal station 301 illustrated in FIG. 3 in that the terminal station 303 includes a channel setter 350*b* instead of the channel setter 350, and further includes a communicator 370. The channel setter 350*b* performs the same processing as that of the channel setter 350 illustrated in FIG. 3 except that the channel setter 350*b* reads the permitted band or the permitted channel corresponding to the transmission time from the band control information received from the base station 403 instead of the permitted band information. The communicator 370 communicates with the base station 403 via a network 500. The network 500 is, for example, a communication network on the ground. The communicator 370 may be connected to the network 500 wirelessly or by wire.

The base station 403 is different from the base station 402 illustrated in FIG. 8 in that the base station 403 includes a control information generator 450*b* instead of the control information generator 450, and further includes a communicator 480. The control information generator 450*b* is different from the control information generator 450 in that the control information generator 450*b* includes a band determiner 452*b* instead of the band determiner 452. The band determiner 452*b* has the same function as the band determiner 452 illustrated in FIG. 8. Further, the band determiner 452*b* notifies the terminal station 303 of the band control information. The communicator 480 communicates with the terminal station 303 via the network 500. The communicator 480 may be connected to the network 500 wirelessly or by wire.

Note that an external apparatus connected to the base station 403 may include the control information generator 450*b* and may include the control information generator 450*b* and the communicator 480.

The wireless communication system 103 operates in the same manner as illustrated in FIG. 5 for transmission and reception of the terminal uplink signal in which the terminal transmission data is set, and operates in the same manner as illustrated in FIG. 7 for transmission and reception of the base station downlink signal in which the reception waveform information is set.

Figure 11:
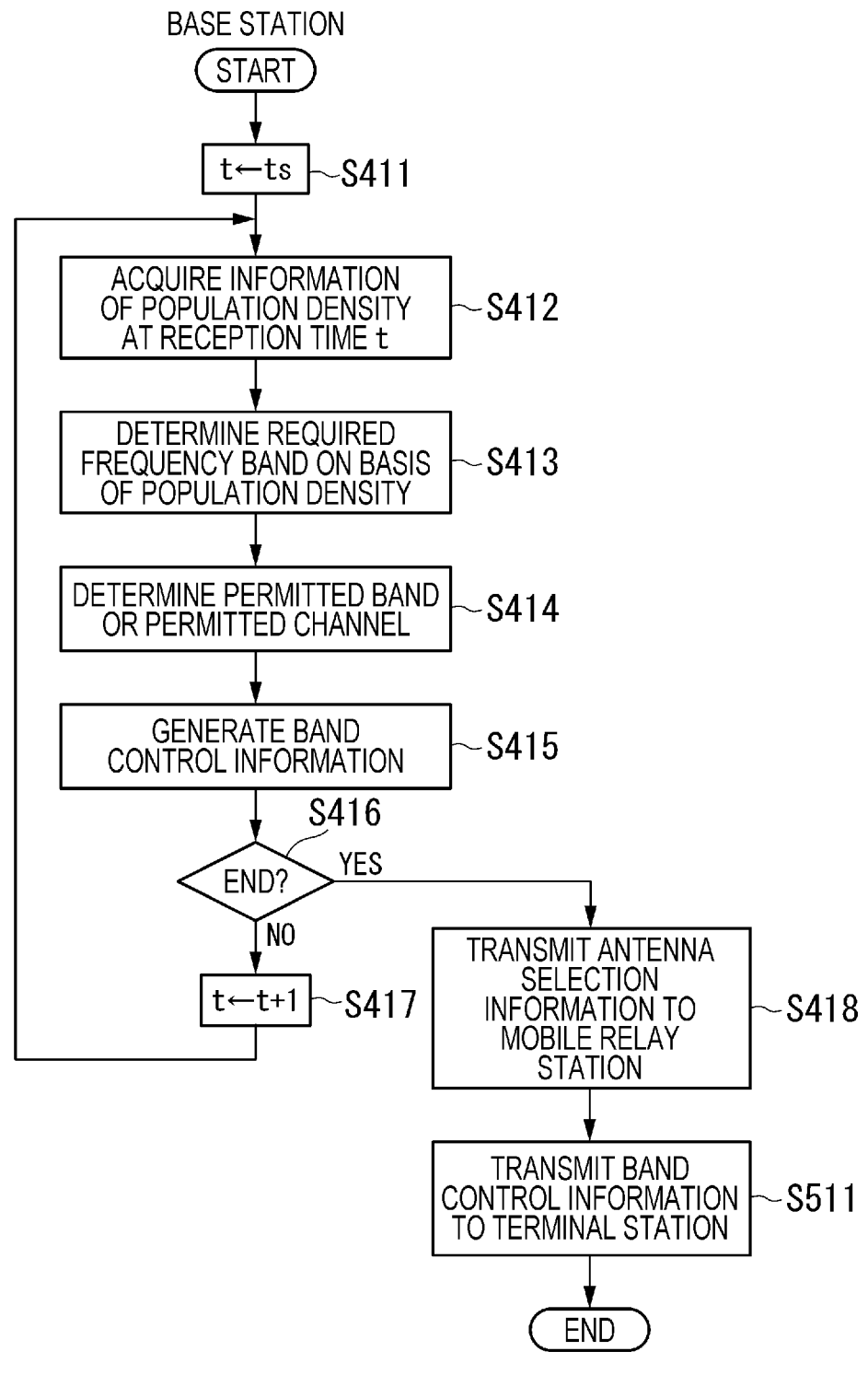
FIG. 11 is a flowchart illustrating processing of a base station according to the embodiment.

FIG. 11 is a flowchart illustrating information generation processing by the base station 403. In the drawing, the same processing as the information generation processing of the second embodiment illustrated in FIG. 9 is denoted by the same reference numeral, and description thereof will be omitted. The base station 403 performs the same processing as steps S411 to S418 in FIG. 9.

Furthermore, although the processing of the mobile relay station 203 is omitted in FIG. 11, the mobile relay station 203 performs the same processing as steps S421 to S423 in FIG. 9.

Further, the band determiner 452*b* of the base station 403 transmits the band control information to the terminal station 303 via the network 500 (step S511). The channel setter 350*b* of the terminal station 303 stores the band control information received from the base station 403.

Figure 12:
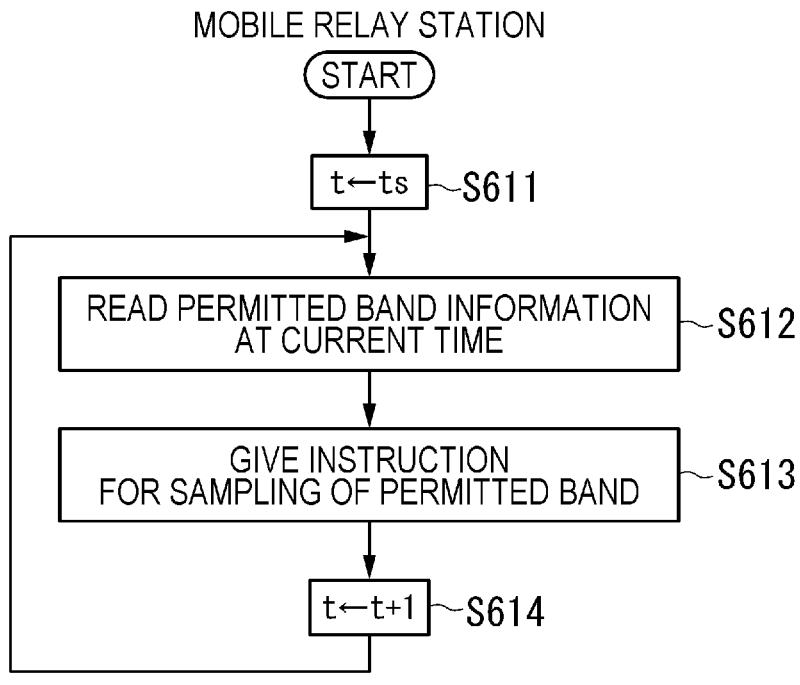
FIG. 12 is a flowchart illustrating processing of a mobile relay station according to the embodiment.

FIG. 12 is a diagram illustrating transmission data control processing in the mobile relay station 203. The band determiner 243*a* of the mobile relay station 203 sets an initial value ts at reception time t (step S611). The initial value ts is the current time. The band determiner 243*a* reads the permitted band information at the reception time t from the band control information stored in the storage 241 (step S612). The band controller 244*b* instructs the reception waveform recorder 224 to sample the band indicated by the permitted band information (step S613). The band indicated by the permitted band information is a permitted band or a band including a permitted channel. Hence, in step S122 of FIG. 5, the reception waveform recorder 224 samples the reception signal of the permitted band and generates the waveform data of the terminal uplink signal. The band determiner 243*a* adds 1 to the reception time t (step S614) and repeats the processing from step S612.

Figure 13:
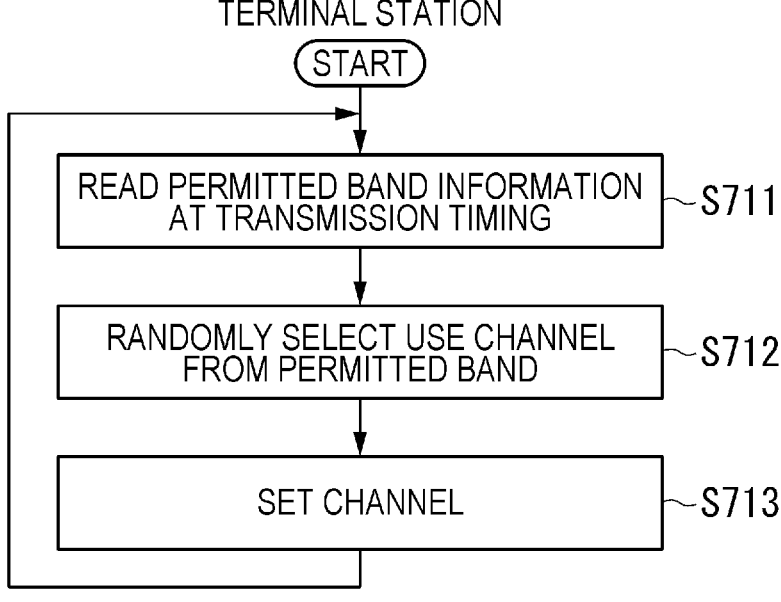
FIG. 13 is a flowchart illustrating processing of a terminal station according to the embodiment.

FIG. 13 is a diagram illustrating channel setting processing in the terminal station 303. The channel setter 350*b* of the terminal station 303 reads the permitted band information corresponding to the time of the transmission timing from the stored band control information (step S711). The channel setter 350*b* performs the same processing as in step S222 in FIG. 6 by using the read permitted band information (step S712). That is, the channel setter 350*b* randomly selects a channel to be used from among channels included in the permitted band indicated by the permitted band information or among the permitted channels indicated by the permitted band information. The channel setter 350*b* sets the selected channel in the transmitter 330 (step S713). Hence, in step S112 of FIG. 5, the transmitter 330 transmits the terminal uplink signal using the channel determined by the channel setter 350*b*.

According to the present embodiment, it is possible to reduce the data amount of the waveform data of the terminal uplink signal while reducing the load of the mobile relay station.

Fourth Embodiment

The wireless communication system of the fourth embodiment determines a required frequency bandwidth for each communication area on the basis of a communication success rate in the same path in the past. That is, the wireless communication system determines the required frequency bandwidth on the basis of information obtained from a decoding result of the terminal uplink signal received when the mobile relay station passed over each communication area in the past and the frequency bandwidth used for the terminal uplink signal. A decoding success rate is used as the information obtained from the decoding result. The communication success rate such as the decoding success rate is an example of the reception quality of the terminal uplink signal. In a communication area where the number of terminal stations (ground IoT terminals) is large, interference is also large, and the reception quality is assumed to be low. Thus, the reception quality is used as information regarding the number of terminal stations. Furthermore, as the information obtained from the decoding result, the number of terminal stations that have transmitted the terminal uplink signal, the number of signals and the data amount of the terminal uplink signals, and the like may be used. A stage where the wireless communication system collects data for determining the required frequency bandwidth, analyzes the collected data, and determines the required frequency bandwidth will be referred to as an analysis phase, and a stage where communication is performed with the required frequency bandwidth determined in the analysis phase will be referred to as a normal operation phase. The analysis phase continues for a time during which the mobile relay station passes through the same path a plurality of times. In the fourth embodiment, differences from the above embodiments will be mainly described.

Figure 14:
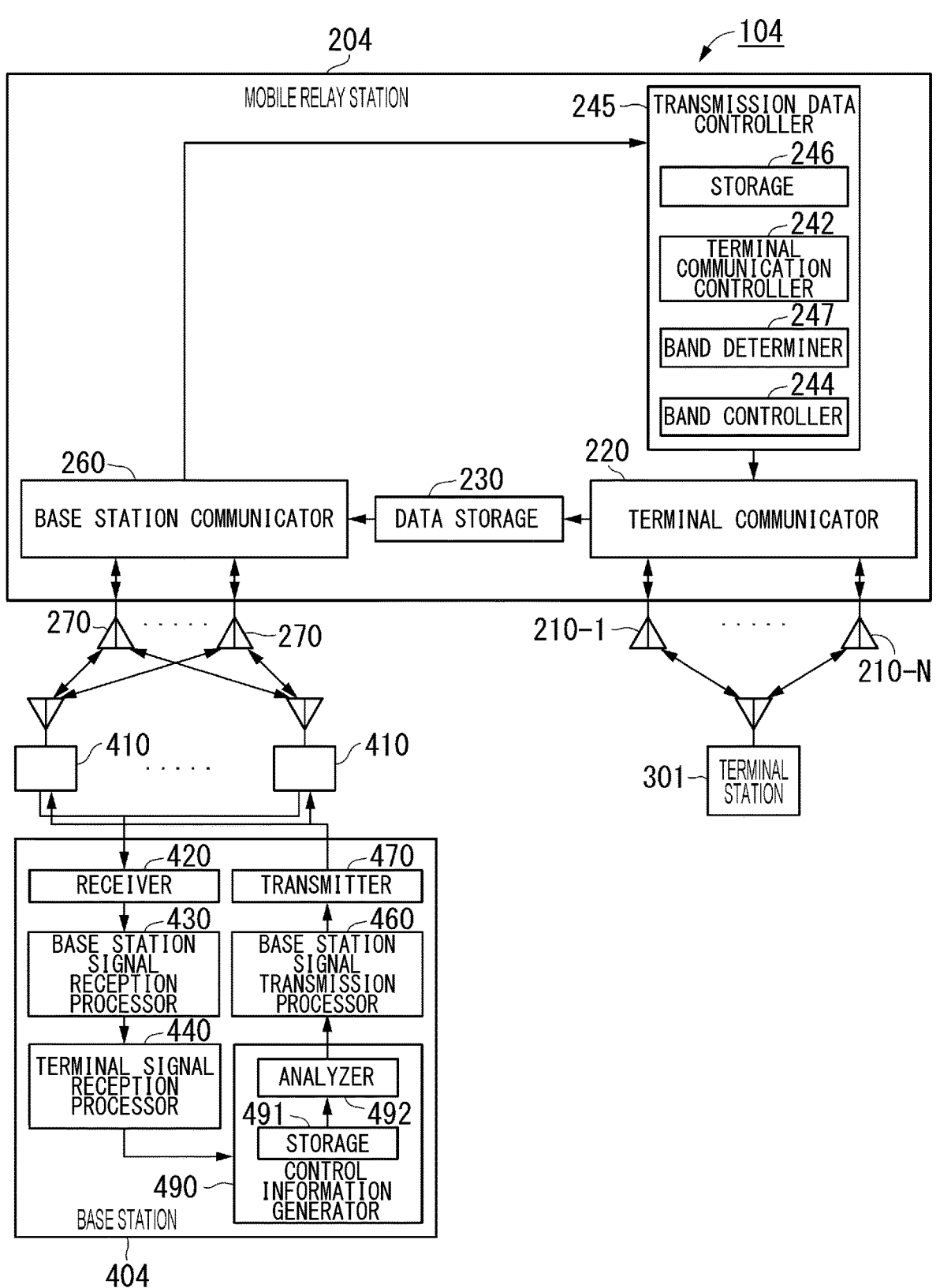
FIG. 14 is a configuration diagram of a wireless communication system according to a fourth embodiment.

FIG. 14 is a configuration diagram of a wireless communication system 104 according to the fourth embodiment. In FIG. 14, the same portions as those of the wireless communication system 102 according to the second embodiment illustrated in FIG. 8 are denoted by the same reference numerals, and description thereof will be omitted. The wireless communication system 104 includes a mobile relay station 204, a terminal station 301, and a base station 404. The mobile relay station 204 is used as the mobile relay station 2 in FIG. 1, and the base station 404 is used as the base station 4 in FIG. 1.

The mobile relay station 204 is different from the mobile relay station 202 illustrated in FIG. 8 in that the mobile relay station 204 includes a transmission data controller 245 instead of the transmission data controller 240a. The transmission data controller 245 includes a storage 246, a terminal communication controller 242, a band determiner 247, and a band controller 244.

The storage 246 stores communication area information and area-specific band information. The area-specific band information is information in which the communication area is associated with the permitted band information. In the analysis phase, the band determiner 247 determines to use a plurality of types of required frequency bandwidths for the same path at different timings. The band determiner 247 determines a permitted band or a permitted channel on the basis of the required frequency bandwidth, and generates permitted band information in which the determined permitted band or permitted channel is set. In the normal operation phase, the band determiner 247 reads the communication area at each time from the communication area information stored in the storage 246, and reads the permitted band information corresponding to the communication area from the area-specific band information stored in the storage 246. The band determiner 247 notifies the terminal station 301 of the permitted band information, and further instructs the reception waveform recorder 224 of the terminal communicator 220 to sample the permitted band.

Furthermore, the band determiner 247 writes the area-specific band information transmitted from the base station 404 in the storage 246.

The base station 404 illustrated in FIG. 14 is different from the base station 402 illustrated in FIG. 8 in that the base station 404 includes a control information generator 490 instead of the control information generator 450. An external apparatus of the base station 404 may include the control information generator 490.

The control information generator 490 includes a storage 491 and an analyzer 492. The storage 491 stores the communication area information of each mobile relay station 204. In the analysis phase, the analyzer 492 determines the required frequency bandwidth in each communication area on the basis of the decoding result by the terminal signal reception processor 440 for each mobile relay station 204. Further, the analyzer 492 determines a permitted band or a permitted channel on the basis of the required frequency bandwidth. The analyzer 492 generates, for each mobile relay station 204, area-specific band information in which the communication area is associated with the permitted band information in which the permitted band or the permitted channel is set. The analyzer 492 notifies each mobile relay station 204 of the area-specific band information generated for the mobile relay station.

The processing of the analysis phase will be described. In the analysis phase, the wireless communication system 104 performs transmission and reception of the terminal uplink signal to which the terminal transmission data is set by the same processing as that of the first embodiment illustrated in FIG. 5.

Figure 15:
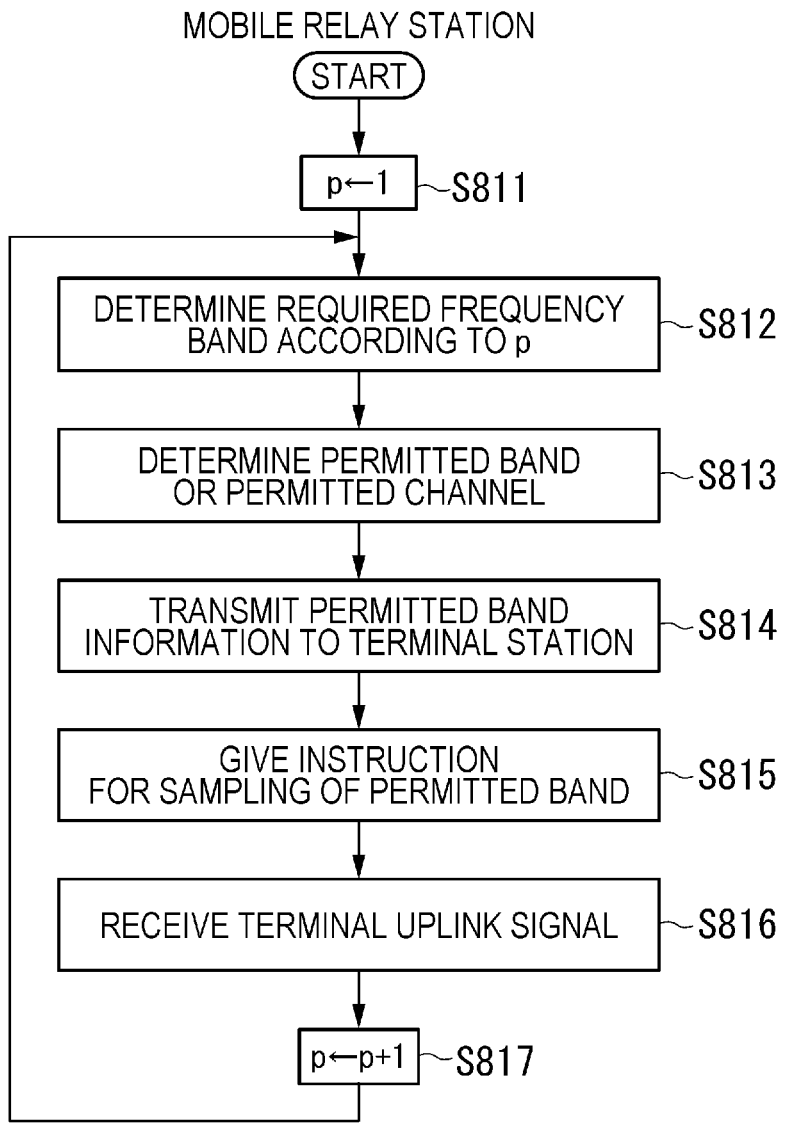
FIG. 15 is a flowchart illustrating processing of a mobile relay station according to the embodiment.

FIG. 15 is a flowchart illustrating transmission data control processing in the analysis phase of the mobile relay station 204. First, the band determiner 247 of the mobile relay station 204 sets initial value 1 to the number of times of passing the same path p (step S811). The band determiner 247 determines the required frequency bandwidth according to the number of times of passing the same path p (step S812). For example, the band determiner 247 determines the required frequency bandwidth the number of times determined in the past in the same path as the current path of which is less than a threshold value. Note that the threshold value is an integer of one or more.

The band determiner 247 determines a permitted band or a permitted channel on the basis of the required frequency bandwidth by the same processing as the band determiner 243 in step S213 in FIG. 6 (step S813). That is, the band determiner 247 selects a frequency band of a required frequency bandwidth within the entire frequency band that can be used for the terminal uplink signal or continuous channels corresponding to the required frequency bandwidth among the available channels Ch1 to ChK as the permitted channel. The band controller 244 transmits the permitted band information in which the permitted band or the permitted channel determined in step S813 is set by the terminal downlink signal (step S814). The terminal station 301 performs the processing of steps S111 and S112 of FIG. 5 and the processing of steps S221 to S223 of FIG. 6, and transmits the terminal uplink signal.

The band controller 244 instructs the reception waveform recorder 224 to sample the permitted band (step S815). The terminal communicator 220 receives the terminal uplink signal and performs the processing of steps S121 and S122 of FIG. 5 (step S816). The terminal communicator 220 writes the reception waveform information of the permitted band in the data storage 230. The band determiner 247 adds 1 to the number of times of passing the same path p (step S817). The mobile relay station 204 repeats the processing from step S812.

In the analysis phase, the mobile relay station 204 performs the processing illustrated in steps S311 to S313 of FIG. 7 and transmits the base station downlink signal in which the reception waveform information is set by MIMO.

Figure 16:
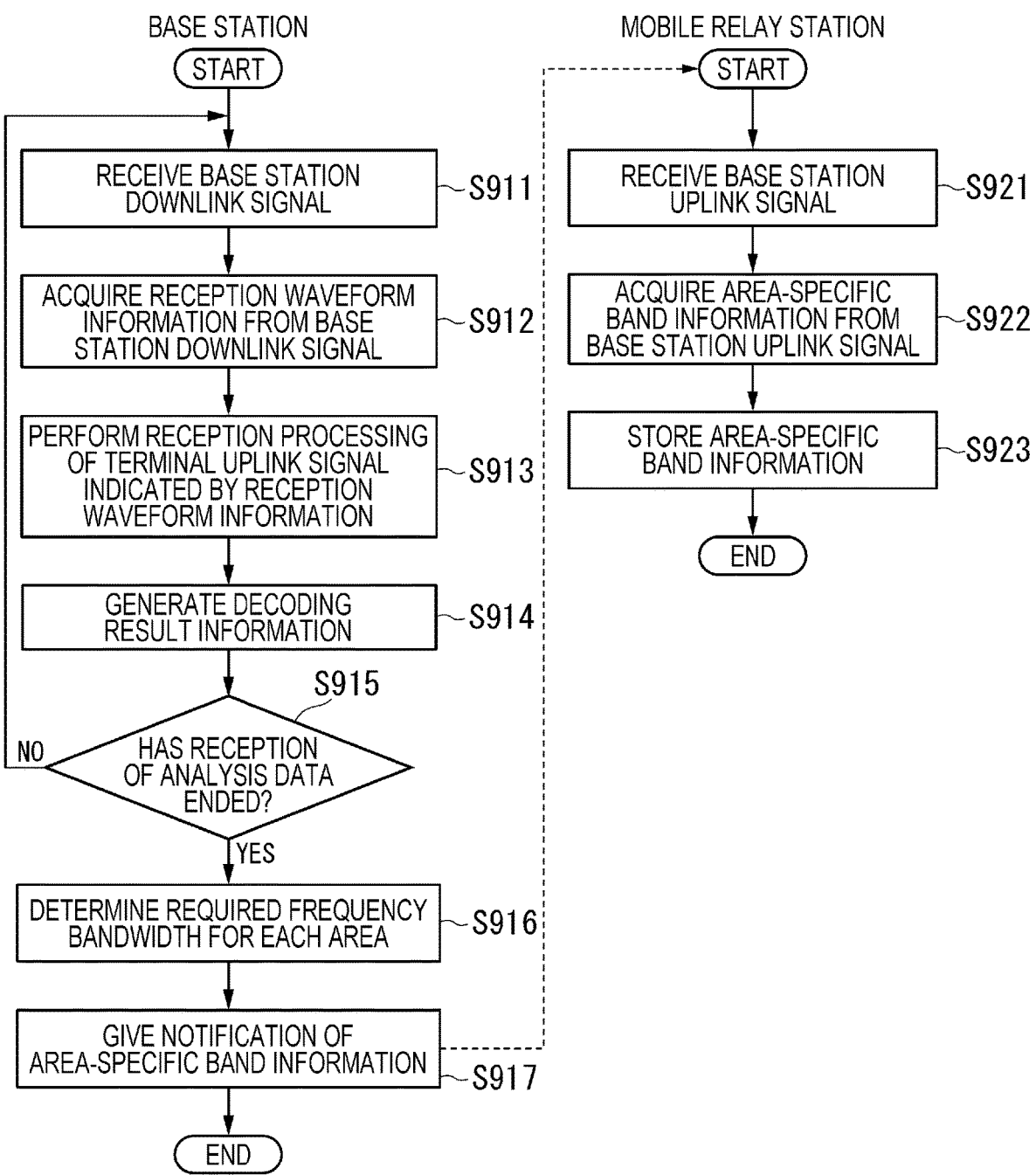
FIG. 16 is a flowchart illustrating processing of the wireless communication system according to the embodiment.

The wireless communication system 104 performs the processing illustrated in FIG. 16 in the analysis phase.

FIG. 16 is a flowchart illustrating information generation processing of the wireless communication system 104 in the analysis phase. The base station 404 receives the base station downlink signal from the mobile relay station 204, and performs the same processing as steps S321 to S323 of FIG. 7 (steps S911 to S913).

The analyzer 492 acquires identification information of the mobile relay station 204 read from the base station downlink signal from the base station signal reception processor 430. Further, the analyzer 492 receives, from the terminal signal reception processor 440, the information of the reception time and the use band information set in the reception waveform information obtained from the base station downlink signal, and the decoding success rate of the waveform data obtained from the reception waveform information at the reception time. The analyzer 492 reads the information of the communication area corresponding to the reception time from the communication area information stored in the storage 491 in association with the identification information of the mobile relay station 204. The analyzer 492 generates decoding result information in which the identification information of the mobile relay station 204, the information of the reception time, the information of the communication area, the use band information, and the decoding success rate are associated with each other, and writes the generated decoding result information in the storage 491 (step S914).

When the reception of analysis data is not ended (step S915: NO), the base station 404 repeats the processing from step S911. When the reception of analysis data is ended (step S915: YES), the base station 404 performs the processing from step S916.

Using the decoding result information generated in step S914, the analyzer 492 analyzes the relationship between the frequency bandwidth indicated by the use band information and the decoding success rate for each communication area, and determines the required frequency bandwidth for each communication area (step S916). For example, the analyzer 492 assumes that, in a certain communication area, the average of the use bandwidth for which a decoding success rate equal to or greater than a predetermined level is obtained is Na, and the maximum value is Nmax. The analyzer 492 may set the required frequency bandwidth to Na or Nmax, may set the required frequency bandwidth to a number obtained by adding a predetermined number to Na or Nmax, or may set the required frequency bandwidth to a number obtained by increasing Na or Nmax by a predetermined proportion. In a case where the required frequency bandwidth takes a stepwise value, the analyzer 492 sets a stepwise value that exceeds the value calculated as described above and is closest to the calculated value as the required frequency bandwidth.

The analyzer 492 determines a permitted band or a permitted channel on the basis of the required frequency bandwidth determined for each communication area by the same processing as that of the band determiner 243 of the first embodiment. The analyzer 492 generates area-specific band information in which the communication area is associated with the permitted band information indicating the permitted band or the permitted channel determined for the communication area.

The mobile relay station 204 communicates with the same communication area while moving. Therefore, the analyzer 492 determines the required frequency bandwidth and the permitted band or the permitted channel by using not only the result of the reception processing of the reception waveform information when the mobile relay station 204 is at a specific position but also the result of the reception processing of the reception waveform information when the mobile relay station 204 is located in the vicinity thereof.

The analyzer 492 outputs the area-specific band information of the mobile relay station 204 to the base station signal transmission processor 460. Hence, the base station 404 transmits the base station uplink signal to which the area-specific band information is set to the mobile relay station 204 (step S917).

Each antenna 270 of the mobile relay station 204 receives the base station uplink signal (step S921). The base station communicator 260 performs the same reception processing as in step S422 in FIG. 9 to acquire area-specific band information (step S922). The base station communicator 260 outputs the acquired area-specific band information to the transmission data controller 245. The band determiner 247 of the transmission data controller 245 writes the area-specific band information in the storage 246 (step S923).

Note that, in the above description, the analyzer 492 determines the required frequency bandwidth from the relationship between the frequency band and the decoding success rate. The analyzer 492 may use the number of terminal stations 301 that have transmitted the terminal uplink signals, the number of terminal uplink signals, or the data amount of the terminal uplink signals instead of the decoding success rate. In this case, the terminal signal reception processor 440 outputs the transmission source information set in the terminal uplink signal obtained from the decoding result, the number of terminal uplink signals, or the data amount of the terminal uplink signals to the analyzer 492. The transmission source information is information for identifying the terminal station 301 that has transmitted the terminal uplink signal. In step S914, the analyzer 492 writes decoding result information in which the transmission source information, the number of terminal uplink signals, or the data amount of the terminal uplink signal is set in the storage 491 instead of the decoding success rate.

Then, in step S916, the analyzer 492 analyzes the relationship between the frequency bandwidth and the number of terminal stations, the number of terminal uplink signals, or the data amount of the terminal uplink signal for each communication area on the basis of the decoding result information, and determines the required frequency bandwidth for each communication area. For example, the analyzer 492 arranges the number of terminal stations, the number of terminal uplink signals, or the data amount of the terminal uplink signal in ascending order of the frequency bandwidth for a certain communication area. The analyzer 492 specifies a frequency bandwidth in which an increase in the number of terminal stations, the number of terminal uplink signals, or the data amount of the terminal uplink signal is equal to or less than a predetermined level. The analyzer 492 sets the required frequency bandwidth to the number obtained by adding a predetermined number to the specified frequency bandwidth or the number obtained by increasing the specified frequency bandwidth by a predetermined proportion.

After the analysis phase, the wireless communication system 104 starts the normal operation phase. In the normal operation phase, the wireless communication system 104 operates in the same manner as illustrated in FIG. 5 for transmission and reception of the terminal uplink signal in which the terminal transmission data is set, and operates in the same manner as illustrated in FIG. 7 for transmission and reception of the base station downlink signal in which the reception waveform information is set. Furthermore, the wireless communication system 104 performs the transmission data control processing of FIG. 6 except for the points described below. That is, instead of the processing of steps S212 to S214, the band determiner 247 of the mobile relay station 204 performs processing of reading information of the communication area at the reception time t representing the current time and acquiring the permitted band information corresponding to the communication area from the area-specific band information stored in the storage 246.

Figure 17:
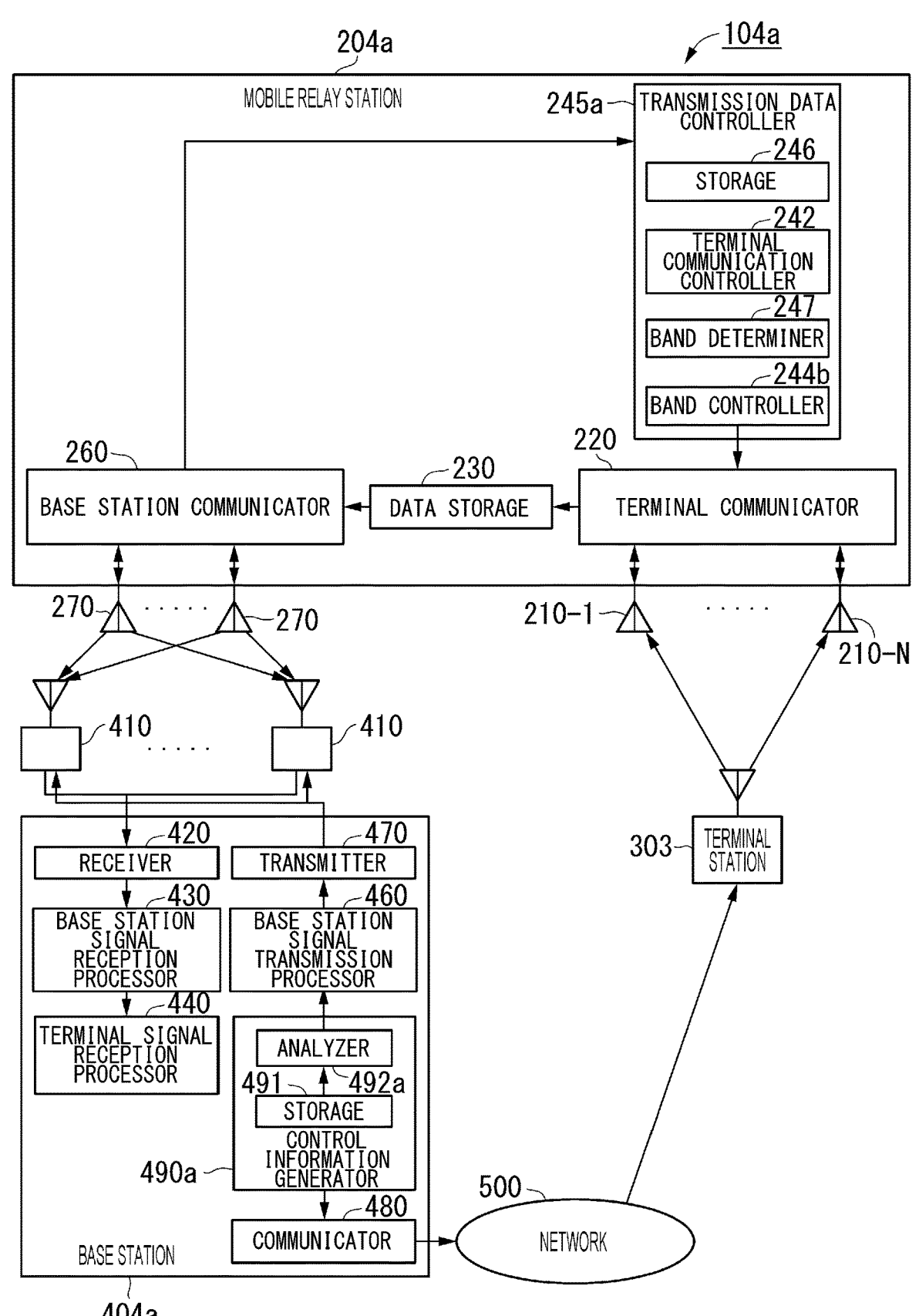
FIG. 17 is a configuration diagram of the wireless communication system according to the embodiment.

Although the mobile relay station 204 transmits the permitted band information to the terminal station 301 in the above description, the base station may notify the terminal station of the permitted band information. FIG. 17 illustrates a wireless communication system in which the base station notifies the terminal station of the permitted band information.

FIG. 17 is a diagram illustrating a configuration of a wireless communication system 104a. The wireless communication system 104a includes a mobile relay station 204a, a terminal station 303, and a base station 404a. The mobile relay station 204a is used as the mobile relay station 2 in FIG. 1, and the base station 404a is used as the base station 4 in FIG. 1.

The mobile relay station 204a is different from the mobile relay station 204 illustrated in FIG. 14 in that the mobile relay station 204a includes a transmission data controller 245a instead of the transmission data controller 245. The transmission data controller 245a is different from the transmission data controller 245 illustrated in FIG. 14 in that the transmission data controller 245a includes the band controller 244b illustrated in FIG. 10 instead of the band controller 244.

The base station 404a illustrated in FIG. 17 is different from the base station 404 illustrated in FIG. 14 in that the base station 404a includes an analyzer 492a instead of the analyzer 492. The analyzer 492a has the same function as the analyzer 492. Further, the analyzer 492a transmits the permitted band information of each area to the terminal station 303 in the area.

The wireless communication system 104a operates in the same manner as illustrated in FIG. 5 for transmission and reception of the terminal uplink signal in which the terminal transmission data is set, and operates in the same manner as illustrated in FIG. 7 for transmission and reception of the base station downlink signal in which the reception waveform information is set. Furthermore, the wireless communication system 104a performs the same information generation processing as in FIG. 16, and further performs the processing described below. That is, the analyzer 492a of the base station 404a transmits the permitted band information of the communication area in which the terminal station 303 is included to the terminal station 303 via the network 500. The analyzer 492a may read, from the communication area information, information of the time when the communication area including the terminal station 303 is the communication destination of the mobile relay station 204a, and add the read time information to the permitted band information. The channel setter 350b of the terminal station 303 stores the permitted band information received from the base station 404a.

In the normal operation phase, the mobile relay station 204a performs the same transmission data control processing as in FIG. 12 except for the point described below. That is, in step S612, the band determiner 247 of the mobile relay station 204a performs processing of reading information of the communication area at the reception time t representing the current time and acquiring the permitted band information corresponding to the communication area from the area-specific band information stored in the storage 246.

Furthermore, the terminal station 303 performs the same channel setting processing as in FIG. 13 except for the point described below. That is, in step S711, the channel setter 350b reads the permitted band information associated with the time of the transmission timing.

Fifth Embodiment

In the fifth embodiment, with a wireless communication system, a mobile relay station controls a required frequency bandwidth on the basis of a rough estimation result of the number of incoming signals. In the fifth embodiment, differences from the above embodiments will be mainly described.

FIG. 18 is a configuration diagram of a mobile relay station 205 according to the fifth embodiment. In FIG. 18, the same portions as those of the mobile relay station 201 according to the first embodiment illustrated in FIG. 2 are denoted by the same reference numerals, and description thereof will be omitted. The mobile relay station 205 is used as the mobile relay station 2 in FIG. 1.

The mobile relay station 205 is different from the mobile relay station 201 illustrated in FIG. 2 in that the mobile relay station 205 includes a transmission data controller 280 instead of the transmission data controller 240. The transmission data controller 280 includes an estimator 281, a terminal communication controller 242, a band determiner 283, and a band controller 244.

The estimator 281 estimates the number of terminals that have transmitted signals on the basis of the terminal uplink signals received by the receiver 222 of the terminal communicator 220 via the plurality of antennas 210. Any existing technology is used for estimation. The band determiner 283 determines a required frequency bandwidth on the basis of the estimation result by the estimator 281. The band determiner 283 determines the required frequency bandwidth by substituting the estimation result into a calculation formula for calculating the required frequency bandwidth using the number of terminals for the signals as a parameter. The calculation formula is predefined. The larger the number of terminals, the wider the required frequency bandwidth.

The wireless communication system of the fifth embodiment operates in the same manner as illustrated in FIG. 5 of the first embodiment for transmission and reception of the terminal uplink signal in which the terminal transmission data is set, and operates in the same manner as illustrated in FIG. 7 of the first embodiment for transmission and reception of the base station downlink signal in which the reception waveform information is set. Furthermore, the mobile relay station 205 of the fifth embodiment performs the same transmission data control processing as in FIG. 5 of the first embodiment except for the point described below. That is, the mobile relay station 205 performs the processing described below instead of the processing of steps S212 to S213. The estimator 281 estimates the number of terminals that have transmitted signals on the basis of the terminal uplink signals received by the receiver 222 via the antennas 210. The band determiner 283 determines a required frequency bandwidth on the basis of the estimation result by the estimator 281.

According to the fifth embodiment, the frequency bandwidth for receiving the terminal uplink signal can be controlled on the basis of the estimated reception state in the mobile relay station.

Sixth Embodiment

In the sixth embodiment, the mobile relay station controls the number of transmitting antennas used to transmit the base station downlink signal to which the reception waveform information is set.

FIG. 19 is a diagram illustrating a mobile relay station 206 according to the sixth embodiment. The mobile relay station 206 includes antennas 210, a terminal communicator 220, a data storage 230, a transmission data controller 291, a transmitting antenna controller 292, a base station communicator 293, and M antennas 270 (M is an integer of two or more).

The transmission data controller 291 is the transmission data controllers 240, 240a, 240b, 245, 245a, and 280 of the first to fifth embodiments described above. The transmitting antenna controller 292 determines the number of transmitting antennas corresponding to the bandwidth of the permitted band or the permitted channel instructed by the transmission data controllers 240, 240a, 240b, 245, 245a, and 280, which are the transmission data controller 291, to the reception waveform recorder 224 of the terminal communicator 220. The base station communicator 293 is the base station communicator 250 or the base station communicator 260. The base station communicator 293 includes a storage 294, a controller 295, a transmission data modulator 253, and a transmitter 254. The storage 294 and the controller 295 correspond to the storage 251 and the controller 252, or the storage 261 and the controller 262.

The transmission data controllers 240, 240a, 240b, 245, 245a, and 280 used as the transmission data controller 291 notify the transmitting antenna controller 292 of the reception bandwidth at the reception time t. The reception bandwidth is a required frequency bandwidth, a bandwidth of a permitted band, or a bandwidth including all permitted channels. The transmitting antenna controller 292 determines the number of transmitting antennas m (m is an integer of one or more and M or less) corresponding to the reception bandwidth at each reception time t on the basis of the correspondence relationship between the predetermined bandwidth and the number of transmitting antennas. The transmitting antenna controller 292 selects the antennas 270 for the determined number of transmitting antennas m from the M antennas 270. The selected antennas 270 are referred to as selected transmitting antennas. The transmitting antenna controller 292 selects the antennas 270 for the number of transmitting antennas m so that the area formed by the selected transmitting antennas is as wide as possible and the density of the selected transmitting antennas in the area is substantially uniform. The transmitting antenna controller 292 notifies the base station communicator 293 of the number of transmitting antennas m at the reception time t and the selected transmitting antennas.

The transmission data modulator 253 reads the reception waveform information at the reception time t from the data storage 230 as transmission data. The transmission data modulator 253 converts the transmission data into parallel signals to be transmitted by m selected transmitting antennas. The transmission data modulator 253 modulates the generated parallel signals. Hence, the base station downlink signal to be transmitted by each selected transmitting antenna is generated.

The transmitter 254 includes a power amplifier corresponding to each antenna 270. When transmitting the base station downlink signal generated by the transmission data modulator 253 from each selected transmitting antenna, the transmitting antenna controller 292 supplies power to the power amplifier corresponding to the selected transmitting antenna, and turns off power supply to the power amplifier corresponding to the antenna 270 other than the selected transmitting antenna. Hence, the base station downlink signal is transmitted from the selected transmitting antenna.

Note that when the transmitter 254 multiplies the base station downlink signal transmitted by each antenna 270 by the weight, the appropriate weight varies depending on the number of selected transmitting antennas. Thus, information in which the number of selected transmitting antennas is associated with the transmission weight of each selected transmitting antenna for each time is stored in advance in the storage 294. When transmitting the base station downlink signal from each selected transmitting antenna, the controller 295 reads the transmission weight of each selected transmitting antenna corresponding to the transmission time and the number of transmitting antennas m from the storage 294. The controller 295 instructs the transmitter 254 to weight each parallel signal modulated by the transmission data modulator 253 with the transmission weight of the selected transmitting antenna that transmits the parallel signal. The transmitter 254 weights the parallel signal generated by the transmission data modulator 253 by the weight instructed from the controller 295 and generates the base station downlink signal transmitted from each selected transmitting antenna.

According to the sixth embodiment, since the power supply of a MIMO transmission system unnecessary when the mobile relay station transmits the base station downlink signal is turned off, the power consumption can be further suppressed.

Seventh Embodiment

In the above embodiments, the frequency conversion of the terminal uplink signal is performed by the mobile relay station. In the present embodiment, the frequency conversion is performed in the base station. Hereinafter, in the present embodiment, differences from the wireless communication system 101 of the first embodiment will be mainly described, but the same differences can be applied to the second to sixth embodiments.

Figure 20:
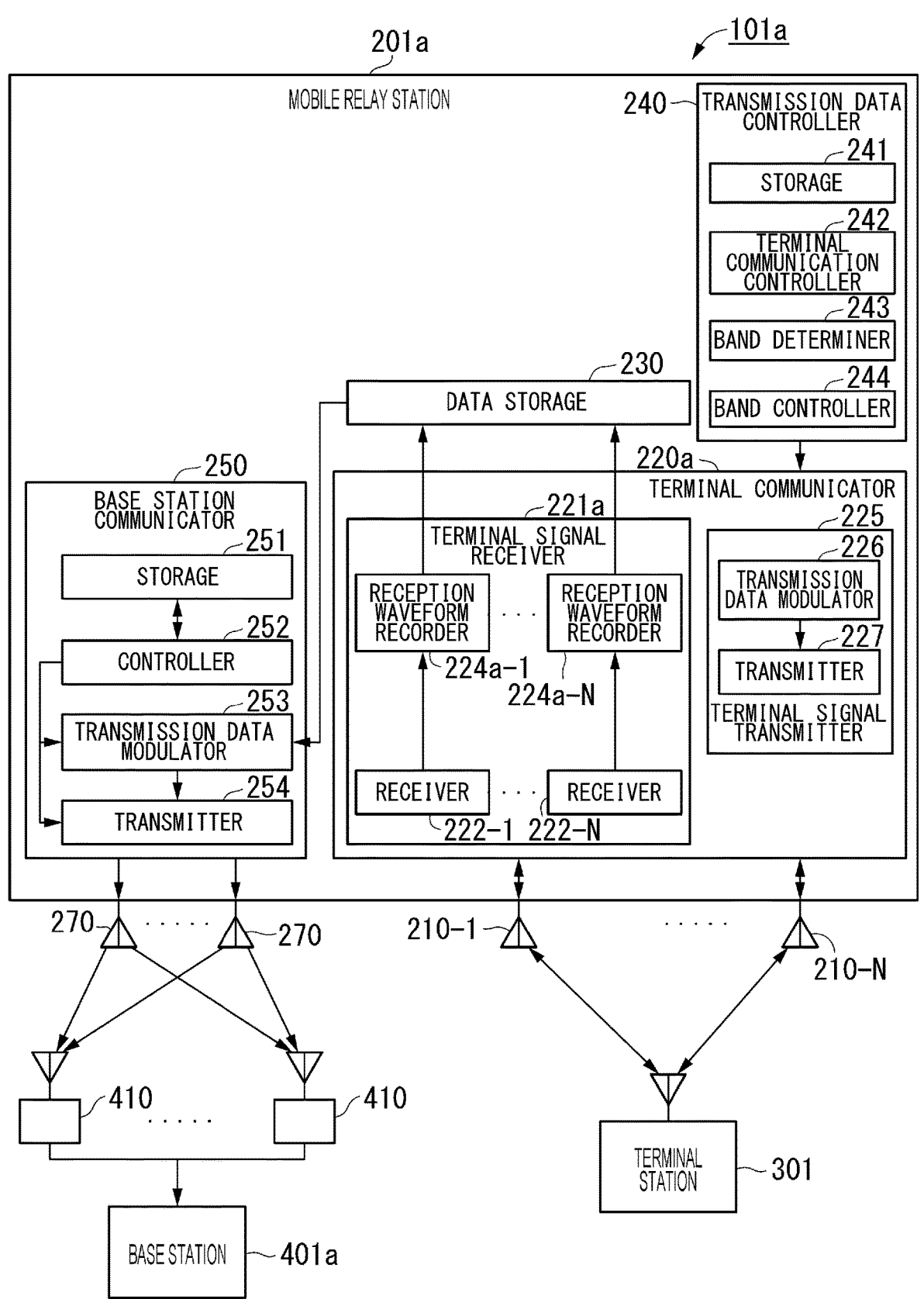
FIG. 20 is a configuration diagram of a wireless communication system according to a seventh embodiment.

FIG. 20 is a diagram illustrating a configuration of a wireless communication system 101a. In FIG. 20, the same portions as those of the wireless communication system 101 illustrated in FIG. 2 are denoted by the same reference numerals, and description thereof will be omitted. The wireless communication system 101a includes a mobile relay station 201a, a terminal stations 301, and a base station 401a.

The mobile relay station 201a illustrated in FIG. 20 is different from the mobile relay station 201 illustrated in FIG. 2 in that the mobile relay station 201a includes a terminal communicator 220a instead of the terminal communicator 220. The terminal communicator 220a includes a terminal signal receiver 221a and a terminal signal transmitter 225. The terminal signal receiver 221a includes N receivers 222 and N reception waveform recorders 224a. The reception waveform recorder 224a connected to the receiver 222-n will be referred to as a reception waveform recorder 224a-n. The reception waveform recorder 224a-n samples the reception waveform of the terminal uplink signal received by the receiver 222-*n* as an RF signal, and generates waveform data indicating a value obtained by the sampling. The reception waveform recorder 224*a*-*n* writes the reception waveform information in which the antenna identification information of the antenna 210-*n*, the reception time of the terminal uplink signal at the antenna 210-*n*, and the generated waveform data are set to the data storage 230. The band controller 244 instructs the reception waveform recorder 224*a* to sample the permitted band.

Figure 21:
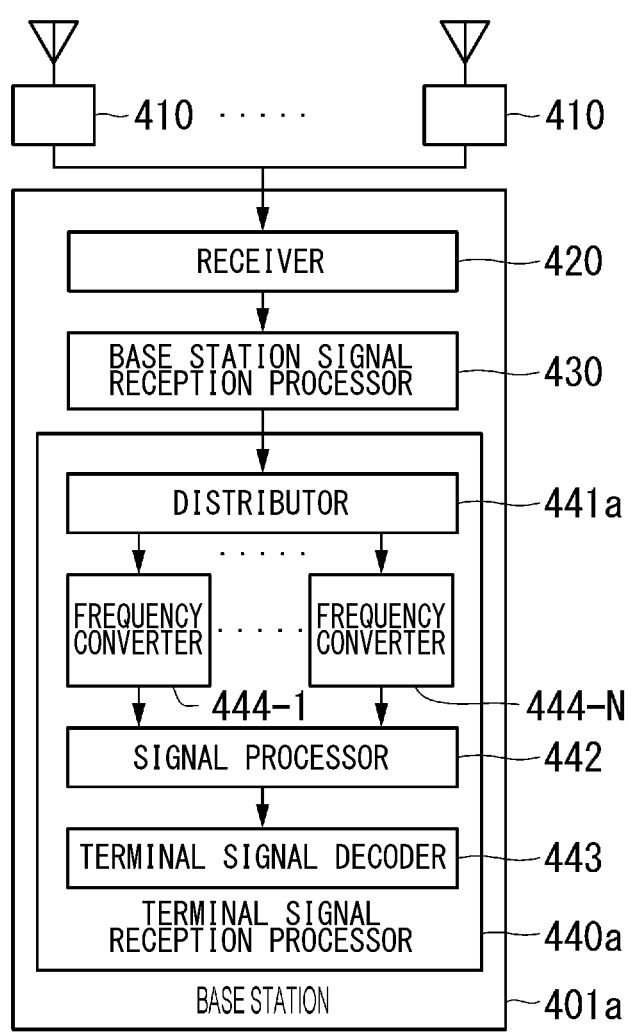
FIG. 21 is a configuration diagram of a base station according to the embodiment.

FIG. 21 is a diagram illustrating a configuration of the base station 401*a*. In FIG. 21, the same portions as those of the base station 401 illustrated in FIG. 4 are denoted by the same reference numerals, and description thereof will be omitted. The base station 401*a* illustrated in FIG. 21 is different from the base station 401 illustrated in FIG. 4 in that the base station 401*a* includes a terminal signal reception processor 440*a* instead of the terminal signal reception processor 440. The terminal signal reception processor 440*a* includes a distributor 441*a*, N frequency converters 444, a signal processor 442, and a terminal signal decoder 443. The N frequency converters 444 are referred to as frequency converters 444-1 to 444-N, respectively.

The distributor 441*a* reads the waveform data of the same reception time from the reception waveform information, and outputs the read waveform data to the frequency converters 444-1 to 444-N according to the antenna identification information associated with the waveform data. That is, the distributor 441*a* outputs the waveform data associated with the antenna identification information of the antenna 210-*n* to the frequency converter 444-*n*. The frequency converter 444-*n* frequency-converts the signal indicated by the input waveform data from an RF signal into a baseband signal. For the frequency conversion, a quadrature demodulator or the like is used. Each of the frequency converters 444-1 to 444-N outputs the frequency-converted signal to the signal processor 442.

In step S122 of FIG. 5, the reception waveform recorder 224*a*-*n* of the mobile relay station 201*a* writes the reception waveform information in which the waveform data representing the waveform of the terminal uplink signal received by the receiver 222-*n*, the reception time, and the antenna identification information of the antenna 210-*n* are associated with each other into the data storage 230. In step S216 of FIG. 6, the band controller 244 instructs the reception waveform recorder 224*a* to sample the permitted band. Furthermore, in step S323 of FIG. 7, the distributor 441*a* reads the waveform data having the same reception time from the reception waveform information. The distributor 441*a* outputs the read waveform data to the frequency converters 444-1 to 444-N according to the antenna identification information associated with the waveform data. The frequency converter 444-*n* frequency-converts the reception signal indicated by the waveform data from an RF signal into a baseband signal. The frequency converter 444-*n* outputs the frequency-converted reception signal to the signal processor 442. Processing after the reception signal is input from each of the frequency converters 444-1 to 444-N to the signal processor 442 is the same as that in the above-described embodiments.

In a case where the differences from the first embodiment described above are applied to the third embodiment, in step S613 of FIG. 12, the band controller 244*b* instructs the reception waveform recorder 224*a* to sample the permitted band. Furthermore, in a case where the differences described above are applied to the fourth embodiment, in step S815 of FIG. 15, the band controller 244 instructs the reception waveform recorder 224*a* to sample the permitted band.

Note that the mobile relay station 201 of the first embodiment described above may include the base station communicator 260 illustrated in FIG. 8 instead of the base station communicator 250. In this case, the base station 401 of the first embodiment illustrated in FIG. 4 includes the base station signal transmission processor 460 and the transmitter 470 illustrated in FIG. 8. When the communication area information or the population density information stored in the storage 241 of the mobile relay station 201 is updated, or when the relational expression or the relational data used in the band determiner 243 is updated, the base station 401 may transmit the updated communication area information, population density information, relational expression, or relational data to the mobile relay station 201. The mobile relay station 201 updates the stored communication area information, population density information, relational expression or relational data to the received communication area information, population density information, relational expression, or relational data.

Similarly, the mobile relay station 205 of the fifth embodiment described above may include the base station communicator 260 illustrated in FIG. 8 instead of the base station communicator 250. In this case, the mobile relay station 205 may update the stored relational expression or relational data to a new relational expression or relational data received from the base station.

Figure 22:
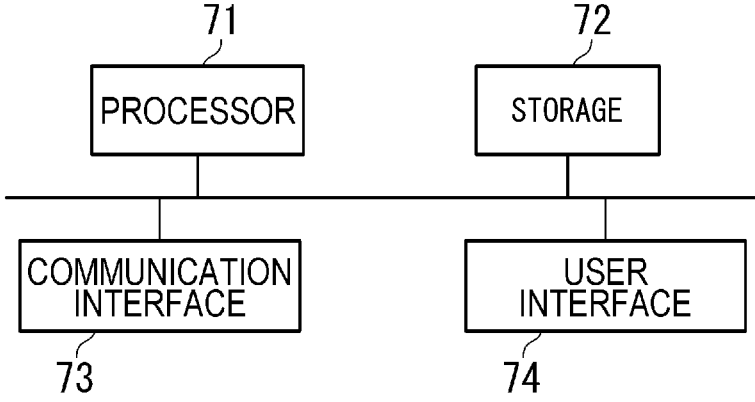
FIG. 22 is a hardware configuration diagram of the mobile relay station according to the first to seventh embodiments.

A hardware configuration example of the mobile relay stations 201, 201*a*, 202, 203, 204, 204*a*, 205, and 206 will be described. FIG. 22 is a apparatus configuration diagram illustrating a hardware configuration example of the mobile relay stations 201, 201*a*, 202, 203, 204, 204*a*, 205, and 206. The mobile relay stations 201, 201*a*, 202, 203, 204, 204*a*, 205, and 206 include a processor 71, a storage 72, a communication interface 73, and a user interface 74.

The processor 71 is a central processing apparatus that performs calculation and control. The processor 71 is a central processing unit (CPU), for example. The storage 72 is a storage apparatusesuch as various memories and a hard disk. The processor 71 reads and executes the program from the storage 72, thereby implementing the transmission data controllers 240, 240*a*, 240*b*, 245, 245*a*, 280, and 291 and the transmitting antenna controller 292. Some of the functions of the transmission data controllers 240, 240*a*, 240*b*, 245, 245*a*, 280, and 291 and the transmitting antenna controller 292 may be implemented using hardware such as an application specific integrated circuit (ASIC), a programmable logic apparatus (PLD), or a field programmable gate array (FPGA). The storage 72 further includes a work area and the like to be used when the processor 71 executes various programs. The communication interface 73 is communicably connected to another apparatus. The communication interface 73 corresponds to the terminal communicators 220 and 220*a* and the base station communicators 250, 260, and 293. The user interface 74 is an input apparatusesuch as a keyboard, a pointing apparatus (a mouse, a tablet, etc.), buttons, a touch panel, or a display apparatusesuch as a display. Artificial operations are input through the user interface 74.

The hardware configurations of the terminal stations 301 and 303 are the same as those in FIG. 22. The processor 71 reads and executes the program from the storage 72, thereby implementing the channel setters 350 and 350*b*. The communication interface 73 corresponds to the transmitter 330, the receiver 340, and the communicator 370.

The hardware configuration of the base stations 401, 401*a*, 402, 403, 404, and 404*a* is the same as that in FIG. 22. The processor 71 reads and executes the program from the storage 72, thereby implementing the control information generators 450, 450*b*, 490, and 490*a*. The communication interface 73 corresponds to the receiver 420, the base station signal reception processor 430, the terminal signal reception processors 440 and 440*a*, the base station signal transmission processor 460, and the transmitter 470.

According to the embodiments described above, it is possible to reduce the data amount when the relay apparatus relays received data while moving. Note that, in the embodiments described above, the case where the mobile object on which the mobile relay station is mounted is an LEO satellite has been described, but it may be another flying object flying above, such as a geostationary satellite, a drone, or a HAPS.

According to the above-described embodiments, the wireless communication system includes a first communication apparatus, a second communication apparatus, and a moving relay apparatus. For example, the first communication apparatus is the terminal stations 3, 301, and 303, the second communication apparatus is the base stations 4, 401, 401*a*, 402, 403, 404, and 404*a*, and the relay apparatus is the mobile relay stations 2, 201, 201*a*, 202, 203, 204, 204*a*, 205, and 206.

The wireless communication system includes the transmission data controller. For example, the transmission data controller includes the transmission data controllers 240, 240*a*, 240*b*, 245, 245*a*, 280, and 291, and the control information generators 450, 450*b*, 490, and 490*a*. The transmission data controller determines a frequency bandwidth according to the relay apparatus position, the frequency bandwidth being used for a first signal transmitted from the first communication apparatus, on the basis of information regarding the number of first communication apparatuses with which the relay apparatus communicates at the relay apparatus position. The transmission data controller transmits band information indicating a frequency band selected from radio frequency bands that can be used for the first signal on the basis of the determined frequency bandwidth to the first communication apparatus.

The first communication apparatus includes a first signal transmitter. The first signal transmitter transmits a first signal having a frequency included in the frequency band indicated by the band information. For example, the first signal transmitter is the transmitter 330 and the channel setters 350 and 350*b*.

The relay apparatus includes a first signal receiver and a second signal transmitter. The first signal receiver receives the first signal transmitted by the first communication apparatus, and acquires waveform data of the received first signal. The second signal transmitter transmits the waveform data acquired by the first signal receiver to the second communication apparatus by a second signal. For example, the first signal receiver is the terminal signal receivers 221 and 221*a*, and the second signal transmitter is the base station communicators 250, 260, and 293.

The second communication apparatus includes a second signal receiver, a second signal reception processor, and a first signal reception processor. The second signal receiver receives the second signal transmitted from the relay apparatus. The second signal reception processor performs the reception processing of the second signal received by the second signal receiver to acquire the waveform data. The first signal reception processor performs the reception processing of the first signal indicated by the waveform data acquired by the second signal reception processor, and acquires the data set in the first signal by the first communication apparatus. For example, the second signal receiver is the receiver 420, the second signal reception processor is the base station signal reception processor 430, and the first signal reception processor is the terminal signal reception processors 440 and 440*a*.

The information regarding the number of first communication apparatuses with which the relay apparatus communicates at the relay apparatus position may be information of population density in a communication area of the relay apparatus at the relay apparatus position or density of communication apparatuses that directly or indirectly communicate with the relay apparatus.

Alternatively, the information regarding the number of first communication apparatuses with which the relay apparatus communicates at the relay apparatus position may be information of the reception quality of the first signal obtained by performing the reception processing in the first signal reception processor on the first signal received when the relay apparatus was located at the relay apparatus position or in the vicinity of the relay apparatus position in the past, the number of first communication apparatuses that have transmitted the first signal, the number of first signals, or the data amount of the first signal. The information regarding the number of first communication apparatuses with which the relay apparatus communicates at the relay apparatus position may be the number of first communication apparatuses estimated on the basis of the first signals received by the first signal receiver of the relay apparatus at the relay apparatus position via the plurality of receiving antennas.

The relay apparatus may further include a transmitting antenna controller. The transmitting antenna controller controls the second signal transmitter to wirelessly transmit the second signal using the transmitting antennas for the number of antennas corresponding to the frequency bandwidth determined by the transmission data controller.

The relay apparatus may include a transmission data controller. Alternatively, the second communication apparatus or a apparatus connected to the second communication apparatus may include the transmission data controller. In this case, the second communication apparatus transmits, to the first communication apparatus, information of the frequency bandwidth determined according to the relay apparatus position by the transmission data controller or band information indicating the frequency band selected on the basis of the frequency bandwidth.

Note that the relay apparatus may be provided in a flying object such as a low earth orbiting satellite. The first communication apparatus and the second communication apparatus may be installed on the earth.

Although the embodiments of the present invention have been described in detail with reference to the drawings, specific configurations are not limited to the embodiments, and include design and the like within the scope of the present invention without departing from the gist of the present invention.

REFERENCE SIGNS LIST 1, 101, 101*a*, 102, 103, 104, 104*a* Wireless communication system
2, 201, 201*a*, 202, 203, 204, 204*a*, 205, 206 Mobile relay station
3, 301, 303 Terminal station
4, 401, 401*a*, 402, 403, 404, 404*a* Base station
71 Processor
72, 241, 241*a*, 246, 251, 261, 294, 451, 491 Storage
73 Communication interface
74 User interface

210-1 to 210-N, 270, 310 Antenna
220, 220a Terminal communicator
221, 221a Terminal signal receiver
222-1 to 222-N, 263, 340, 420 Receiver
223-1 to 223-N, 444-1 to 444-N Frequency converter
224-1 to 224-N, 224a-1 to 224a-N Reception waveform recorder
225 Terminal signal transmitter
226, 253 Transmission data modulator
227, 254, 330, 470 Transmitter
230, 320 Data storage
240a, 240a, 240b, 245, 245a, 280, 291 Transmission data controller
242 Terminal communication controller
243, 243a, 247, 283, 452, 452b Band determiner
244, 244a, 244b Band controller
245, 245a Transmission data controller
250, 260, 293 Base station communicator
252, 262, 295 Controller
264 Reception processor
281 Estimator
292 Transmitting antenna controller
350, 350b Channel setter
360 Transmission timing controller
370, 480 Communicator
410 Antenna station
430 Base station signal reception processor
440, 440a Terminal signal reception processor
441, 441a Distributor
442 Signal processor
443 Terminal signal decoder
450, 450b, 490, 490a Control information generator
460 Base station signal transmission processor
492, 492a Analyzer
500 Network

The invention claimed is:

1. A wireless communication system with a first communication apparatus, a second communication apparatus, and a relay apparatus moving, the wireless communication system comprising:

a transmission data controller that determines a frequency bandwidth according to a relay apparatus position, the frequency bandwidth being used for a first signal transmitted from the first communication apparatus, on a basis of information regarding a number of first communication apparatuses with which the relay apparatus communicates at the relay apparatus position, and transmits band information indicating a frequency band selected on a basis of the frequency bandwidth from a radio frequency band that can be used for the first signal to the first communication apparatus, wherein the first communication apparatus includes:

a first signal transmitter that transmits the first signal having a frequency included in the frequency band indicated by the band information, the relay apparatus includes:

a first signal receiver that receives the first signal transmitted by the first communication apparatus and acquires waveform data of the first signal received; and a second signal transmitter that transmits the waveform data acquired by the first signal receiver to the second communication apparatus by a second signal, and the second communication apparatus includes:

a second signal receiver that receives the second signal transmitted from the relay apparatus;

a second signal reception processor that performs reception processing of the second signal received by the second signal receiver and acquires the waveform data; and a first signal reception processor that performs reception processing of the first signal indicated by the waveform data acquired by the second signal reception processor and acquires data set to the first signal by the first communication apparatus.

2. The wireless communication system according to claim 1, wherein the information regarding the number of the first communication apparatuses is information of population density in a communication area of the relay apparatus at the relay apparatus position or density of communication apparatuses that directly or indirectly communicate with the relay apparatus.

3. The wireless communication system according to claim 2, wherein the relay apparatus further includes a transmitting antenna controller that controls the second signal transmitter to wirelessly transmit the second signal using transmitting antennas for a number of antennas corresponding to the frequency bandwidth determined by the transmission data controller.

4. The wireless communication system according to claim 2, wherein the relay apparatus is included in a flying object.

5. The wireless communication system according to claim 1, wherein the information regarding the number of the first communication apparatuses is information of reception quality of the first signal obtained by performing reception processing in the first signal reception processor on the first signal received when the relay apparatus was located at the relay apparatus position or in a vicinity of the relay apparatus position in past, the number of the first communication apparatuses that have transmitted the first signal, a number of the first signals, or data amount of the first signal.

6. The wireless communication system according to claim 5, wherein the relay apparatus further includes a transmitting antenna controller that controls the second signal transmitter to wirelessly transmit the second signal using transmitting antennas for a number of antennas corresponding to the frequency bandwidth determined by the transmission data controller.

7. The wireless communication system according to claim 5, wherein the relay apparatus is included in a flying object.

8. The wireless communication system according to claim 1, wherein the information regarding the number of the first communication apparatuses is a number of the first communication apparatuses estimated on a basis of the first signals received by the first signal receiver of the relay apparatus at the relay apparatus position via a plurality of receiving antennas.

9. The wireless communication system according to claim 8, wherein the relay apparatus further includes a transmitting antenna controller that controls the second signal transmitter to wirelessly transmit the second signal using transmitting antennas for a number of antennas corresponding to the frequency bandwidth determined by the transmission data controller.

10. The wireless communication system according to claim 8, wherein the relay apparatus is included in a flying object.

11. The wireless communication system according to claim 1, wherein the relay apparatus further includes a transmitting antenna controller that controls the second signal transmitter to wirelessly transmit the second signal using transmitting antennas for a number of antennas corresponding to the frequency bandwidth determined by the transmission data controller.

12. The wireless communication system according to claim 11, wherein the relay apparatus is included in a flying object.

13. The wireless communication system according to claim 1, wherein the transmission data controller is included in the relay apparatus.

14. The wireless communication system according to claim 13, wherein the relay apparatus is included in a flying object.

15. The wireless communication system according to claim 1, wherein the transmission data controller is included in the second communication apparatus or a apparatus connected to the second communication apparatus, and the second communication apparatus transmits, to the first communication apparatus, information of the frequency bandwidth determined by the transmission data controller according to the relay apparatus position or the band information indicating a frequency band selected on a basis of the frequency bandwidth.

16. The wireless communication system according to claim 15, wherein the relay apparatus is included in a flying object.

17. The wireless communication system according to claim 1, wherein the relay apparatus is included in a flying object.

18. The wireless communication system according to claim 1, wherein the relay apparatus is included in a low earth orbiting satellite, and the first communication apparatus and the second communication apparatus are installed on earth.

19. A relay apparatus in a wireless communication system with a first communication apparatus, a second communication apparatus, and the relay apparatus moving, the relay apparatus comprising:

a transmission data controller that determines a frequency bandwidth according to a relay apparatus position, the frequency bandwidth being used for a first signal transmitted from the first communication apparatus, on a basis of information regarding a number of first communication apparatuses with which the relay apparatus communicates at the relay apparatus position, and transmits band information indicating a frequency band selected on a basis of the frequency bandwidth from a radio frequency band that can be used for the first signal to the first communication apparatus;

a first signal receiver that receives the first signal transmitted by the first communication apparatus at a frequency included in a radio frequency band indicated by the band information and acquires waveform data of the first signal received; and a second signal transmitter that transmits the waveform data acquired by the first signal receiver to the second communication apparatus by a second signal.

20. A wireless communication method executed by a wireless communication system with a first communication apparatus, a second communication apparatus, and a relay apparatus moving, the wireless communication method comprising:

determining, by a transmission data controller, a frequency bandwidth according to a relay apparatus position, the frequency bandwidth being used for a first signal transmitted from the first communication apparatus, on a basis of information regarding a number of first communication apparatuses with which the relay apparatus communicates at the relay apparatus position, and transmitting band information indicating a frequency band selected on a basis of the frequency bandwidth from a radio frequency band that can be used for the first signal to the first communication apparatus;

transmitting, by the first communication apparatus, the first signal having a frequency included in the frequency band indicated by the band information;

receiving, by the relay apparatus, the first signal transmitted by the first communication apparatus and acquiring, by the relay apparatus, waveform data of the first signal received;

transmitting, by the relay apparatus, the waveform data acquired by the relay apparatus to the second communication apparatus by a second signal;

receiving, by the second communication apparatus, the second signal transmitted from the relay apparatus;

performing, by the second communication apparatus, reception processing of the second signal received and acquiring, by the second communication apparatus, the waveform data; and performing, by the second communication apparatus, reception processing of the first signal indicated by the waveform data acquired by the second communication apparatus and acquiring data set to the first signal by the first communication apparatus.

* * * * *